United States Patent
Shindgikar et al.

(10) Patent No.: US 8,371,381 B2
(45) Date of Patent: Feb. 12, 2013

(54) ENGINEERED FIBERS FOR WELL TREATMENTS

(75) Inventors: Nikhil Shindgikar, Paris (FR); Jesse Lee, Paris (FR); Slaheddine Kefi, Velizy Villacoublay (FR); Chrystel Cambus-Brunet, Richebourg (FR); Michel Ermel, St Lambert des Bois (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 327 days.

(21) Appl. No.: 12/783,232

(22) Filed: May 19, 2010

(65) Prior Publication Data

US 2010/0307747 A1 Dec. 9, 2010

(30) Foreign Application Priority Data

Jun. 5, 2009 (EP) .................................. 09290413
May 17, 2010 (WO) ................. PCT/EP2010/003051

(51) Int. Cl.
- *E21B 21/00* (2006.01)
- *E21B 33/138* (2006.01)
- *E21B 43/26* (2006.01)
- *C09K 8/03* (2006.01)
- *C09K 8/035* (2006.01)
- *C09K 8/92* (2006.01)

(52) U.S. Cl. ........ 166/281; 166/292; 166/294; 166/295; 175/72; 507/117; 507/124; 507/140; 507/269

(58) Field of Classification Search .......... 166/281–283, 166/292, 294, 295; 175/72; 507/117, 124, 507/140, 219, 230, 269
See application file for complete search history.

(56) References Cited

U.S. PATENT DOCUMENTS

| | | | |
|---|---|---|---|
| 2,119,829 A | 6/1938 | Parsons | |
| 2,214,366 A | 9/1940 | Freeland | |
| 2,398,347 A | 4/1946 | Anderson | |
| 2,599,745 A | 6/1952 | Twining | |
| 2,610,149 A | 9/1952 | Van Dyke | |
| 2,634,236 A | 4/1953 | Fisher et al. | |
| 2,648,522 A | 8/1953 | Armantrout | |
| 2,727,001 A | 12/1953 | Rowe | |
| 2,739,940 A | 3/1956 | Barrett | |
| 2,749,308 A | 6/1956 | Van Beckum | |
| 2,756,209 A * | 7/1956 | Morgan | 507/104 |
| 2,789,948 A | 4/1957 | Tronolone | |

(Continued)

FOREIGN PATENT DOCUMENTS

| CA | 715900 | 8/1965 |
|---|---|---|
| EP | 1284248 | 8/2008 |

(Continued)

OTHER PUBLICATIONS

MUD Design to Minimize Rock Impairment Due to Particle Invasion (SPE 5713).

(Continued)

*Primary Examiner* — George Suchfield

(74) *Attorney, Agent, or Firm* — Matthias Abrell

(57) ABSTRACT

Mixtures of fibers and solid particles are effective for curing fluid losses and lost circulation in a subterranean well. Stiff fibers are more effective than flexible ones; however, mixtures of stiff and flexible fibers have a synergistic effect. The quantity and particle-size distribution of the solids are optimized according to the stiffness, dimensions and concentrations of fibers.

19 Claims, 15 Drawing Sheets

U.S. PATENT DOCUMENTS

| | | | |
|---|---|---|---|
| 2,793,995 | A | 5/1957 | Twining |
| 2,799,647 | A | 7/1957 | Bert Borcherdt |
| 2,811,488 | A | 10/1957 | Tronolone et al. |
| 2,815,079 | A | 12/1957 | Goins |
| 2,830,948 | A | 4/1958 | Popham |
| 2,894,906 | A | 7/1959 | Sheeler |
| 2,912,380 | A | 11/1959 | Groves |
| 2,935,472 | A | 5/1960 | Klaas |
| 2,943,679 | A | 7/1960 | Fischer et al. |
| 3,042,608 | A | 7/1962 | Gr Morris |
| 3,375,888 | A | 4/1968 | Randall |
| 3,380,542 | A | 4/1968 | Clear |
| 3,471,402 | A | 10/1969 | Sauber et al. |
| 3,496,902 | A | 2/1970 | Cleary et al. |
| 3,574,099 | A | 4/1971 | Ryals |
| 3,629,102 | A | 12/1971 | Lummus et al. |
| 3,723,311 | A | 3/1973 | Lummus et al. |
| 3,788,405 | A | 1/1974 | Taylor |
| 4,110,225 | A | 8/1978 | Cagle |
| 4,422,948 | A | 12/1983 | Corley et al. |
| 4,428,843 | A | 1/1984 | Cowan et al. |
| 4,439,328 | A | 3/1984 | Moity |
| 4,526,240 | A | 7/1985 | McKinley et al. |
| 4,531,594 | A | 7/1985 | Cowan |
| 4,767,549 | A | 8/1988 | McEwen et al. |
| 5,782,300 | A | 7/1998 | James et al. |
| 6,060,163 | A | 5/2000 | Naaman |
| 6,172,011 | B1 | 1/2001 | Card et al. |
| 6,632,527 | B1 | 10/2003 | McDaniel et al. |
| 6,902,002 | B1 | 6/2005 | Chatterji et al. |
| 2005/0170973 | A1 | 8/2005 | Verret |
| 2006/0157248 | A1 | 7/2006 | Hoefer et al. |
| 2006/0174802 | A1 | 8/2006 | Bedel et al. |
| 2007/0056730 | A1 | 3/2007 | Keese et al. |
| 2008/0103065 | A1 | 5/2008 | Reddy et al. |
| 2012/0108472 | A1* | 5/2012 | Wu .............................. 507/112 |

FOREIGN PATENT DOCUMENTS

| | | |
|---|---|---|
| WO | 2004101704 | 11/2004 |
| WO | 2006082359 | 8/2006 |

OTHER PUBLICATIONS

Optimizing the Selection of Bridging Particles for Reservoir Drilling Fluids (SPE 58793).

* cited by examiner

ENGINEERED FIBERS FOR WELL TREATMENTS

BACKGROUND OF THE INVENTION

The statements in this section merely provide background information related to the present disclosure and may not constitute prior art.

In many well treatments it is necessary to inject a fluid into the well under pressure. If some or all of the fluid leaks out of the wellbore, this is termed "fluid loss". If the treatment is one, such as drilling, in which the fluid is supposed to be returned to the surface, if some or all of the fluid does not return due to fluid loss, this is called "lost circulation." Lost circulation is a decades-old problem, but there is still not a single solution that can cure all lost-circulation situations. There are many available products and techniques, such as polymer pills and cement plugs, to cure lost-circulation issues.

One of the simplest approaches is to add a lost circulation material (LCM) in the drilling fluid and/or in the cement or polymer system. LCM systems often contain fibers. One of the major advantages of using fibers is the ease with which they can be handled. There is a wide variety of fibers available to the oilfield. Most are made from natural celluloses, synthetic polymers, and ceramics, minerals or glass. All are available in various shapes, sizes, and flexibilities.

Fibers decrease the permeability of a loss zone by creating a porous web or mat that filters out solids in the fluid, forming a low-permeability filter cake that can plug or bridge the loss zones. Typically, a very precise particle-size distribution must be used with a given fiber to achieve a suitable filter cake. Despite the wide variety of available fibers, the success rate and the efficiency are not always satisfactory.

There is a need for fibers that are less sensitive to the sizes of particles in the fluids, that can block wide fractures even when the particles are small, that can survive changes in pressure, that can control spurt (the large amount of fluid often lost very quickly as the filter cake is being formed), and that can control the total fluid loss.

Those skilled in the art will appreciate that the use of fibers in the context of lost circulation during well construction is distinctly different from that associated with well-stimulation treatments such as acidizing and hydraulic fracturing. The principal differences between the two applications are associated with permeability. The goal of lost circulation control during drilling or primary cementing is to block the flow of wellbore fluids into the formation. This involves reducing the permeability between the wellbore and the formation. On the other hand, the goal of stimulation treatments is to increase the effective permeability between the wellbore and the formation. Thus, any stimulation treatments involving fibers should not result in a permeability decrease.

Another distinction between well construction and well stimulation is the fluid-flow direction. During drilling and primary cementing, fluid flow into the formation is generally to be avoided. The goal is to decrease the fluid-flow rate or stop it altogether. Conversely, stimulation operations are concerned with increasing the rate at which fluids flow out of the formation and into the wellbore.

A notable application of fibers in the context of hydraulic fracturing is proppant flowback control. Fibers are mixed with proppant in a way such that, when the well produces, the fibers prevent migration of proppant particles away from the fracture and into the wellbore. Yet the proppant pack containing fibers must remain permeable and allow efficient reservoir-fluid production. Such a condition would have no utility in the context of lost circulation control.

SUMMARY OF THE INVENTION

Methods are given for blocking fluid flow through one or more pathways in a subterranean formation penetrated by a wellbore. One aspect includes selecting compositions, concentrations and dimensions of stiff fibers and solid plugging particles, preparing a blocking fluid containing the stiff fibers and the blend of the solid plugging particles, and forcing the blocking fluid into the pathway. The pathway typically has one dimension at the formation face of at least about 1 mm. The stiff fibers form a mesh across the pathway and the solid particles plug the mesh and block fluid flow. The blocking fluid preferably contains mica, and the solid plugging particles preferably include calcium carbonate.

In one embodiment, the stiff fibers preferably have a Young's modulus of from about 0.5 to about 100 GPa, more preferably from about 1 to about 80 GPa. The stiff fibers preferably have a shortest cross-sectional distance of from about 80 to about 450 microns. The stiff fibers preferably have a length of from about 5 to about 24 mm. The stiff fibers have a value of the parameter $S=Ed^4/Wl^3$ in which S is the stiffness, E is Young's modulus, d is the diameter, W is the force causing a deflection, and l is the length, of from about 2 to about 400,000 times the value of that parameter for a fiber having a modulus of 65 GPa, a diameter of 20 microns, and a length of 12 mm.

In the method, the stiff-fiber concentration is preferably from about 2.85 kg/m$^3$ to about 42.8 kg/m$^3$. The fluid preferably also contains fibers that are selected from non-stiff fibers, differing stiff fibers, or both. The non-stiff fibers preferably have a Young's modulus of from about 0.5 to about 10 GPa, and a shortest cross-sectional distance of from about 10 to about 100 microns. In this document, the terms "non-stiff" and "flexible" shall be used interchangeably. The total fiber concentration is preferably between about 2.85 and 42.8 kg/m$^3$.

In another embodiment, the concentration or composition of the stiff fibers is varied during the treatment. In yet another embodiment, the pathway is a hydraulic fracture, and the fluid flow into the formation is blocked.

A further aspect of the invention relates to treating lost circulation by pumping the blocking fluid into the well continuously until fluid flow into the pathway is satisfactorily reduced. This procedure is mainly associated with drilling operations and primary cementing.

Yet another aspect of the invention relates to treating lost circulation by placing a discrete, desired amount of blocking fluid adjacent to and/or into the pathway. This procedure is primarily associated with remedial treatments such as setting plugs and squeeze operations.

DETAILED DESCRIPTION OF THE INVENTION

Figure 1:
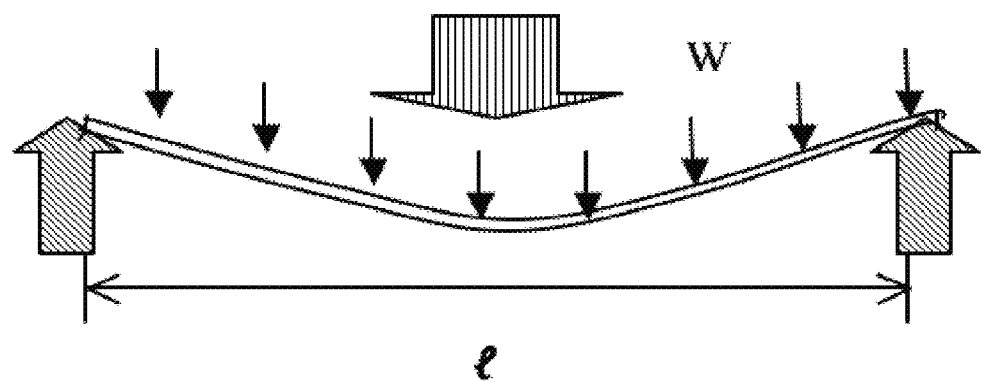
FIG. 1 is a schematic diagram depicting fiber deflection arising from an applied force.

Although the following discussion emphasizes blocking fractures encountered during drilling, the fibers and methods of the invention may also be used during cementing and other operations in which fluid loss or lost circulation are encountered. The invention will be described in terms of treatment of vertical wells, but is equally applicable to wells of any orientation. The invention will be described for hydrocarbon-production wells, but it is to be understood that the invention can be used for wells for the production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

The inventors have surprisingly found that, in the use of mixtures of fibers and solid particles to cure fluid losses and lost circulation, an important factor in the selection and use of suitable fibers is that they must not be too flexible (bend too easily) or too brittle (break too easily) for their length. In the present disclosure the term "stiff" will be used for suitable fibers. By stiff, it is to be understood that the fibers are neither too flexible nor too brittle.

The stiff fibers of the invention, suitable for curing even total lost circulation situations in oilfield operations, must have a specific combination of Young's modulus (as will be discussed in detail below), diameter or other cross-sectional dimension, and length. Fiber suitability may also be determined by chemical composition and state (for example crystallinity), dimensions and shapes (for example cross-sectional shapes). Suitable stiffness is preferably a function of Young's modulus, length, and diameter (or longest cross-sectional dimension if not circular)—these factors may compensate for one another. For example, a low-Young's modulus fiber may be "stiff" if it has a sufficiently large diameter or is sufficiently short. Suitable fibers generally have a Young's modulus between about 0.5 and about 100 GPa, preferably from about 1.0 to about 80 GPa, more preferably from about 1.0 to about 10 GPa and most preferably from about 1.5 to about 4 GPa. The fiber diameter (or, if not circular, the shortest cross-sectional dimension) is generally between about 80 and about 450 microns, preferably about 100 to about 400 microns. The fiber length is generally between about 5 and about 24 mm, preferably about 6 to about 20 mm.

Suitable fibers have a "stiffness" to be more precisely defined below of about 100 to about 3000 times that of the glass fibers used in the experiments described below, which typically have a 20-micron diameter and a Young's modulus of about 65 GPa. Fibers according to the present invention are used with a blend of plugging particles that may be already present in the fluid or added to the fluid with the fibers. The particle-size distribution (PSD) of the blend of particles may optionally be optimized.

Although most of the experiments in the accompanying examples were performed with water-based fluids, the combination of suitable fibers and a particle blend may also be used in oil-base fluids. Optionally, wetting agents may be used to ensure that the materials are oil-wettable in oil-based muds or water-wettable in water-based muds. It will be within the general knowledge of the skilled person to perform laboratory tests to ensure fluid compatibility, that the fluid can transport the particles at the required pumping rates, and suitability for the size of the openings in the fluid-loss pathways to be plugged. Fluids envisioned include, but are not limited to, drilling fluids, polymer pills, cement slurries, chemical washes and spacers.

The fibers may be used before or during operations such as cementing. Unlike fibers from the art, the stiff fibers and methods of the invention are less sensitive to the particle sizes and fiber concentrations in the fluids. In addition, they demonstrate better resistance to pressure changes, and they provide robust performance in terms of reproducibility, spurt control and fluid-loss control. Notably, unlike previous fibers in the art, they can cover wide fracture widths—between about 1 mm to about 6 mm.

The fibers and methods of the invention provide solutions for a variety of situations, including (but not limited to) curing lost circulation of downhole fluids, fluid loss during gravel packing, fluid loss during wellbore consolidation treatments, cracking of cements, and other problems in oilfield operations. The invention may also be used in remedial treatments. One example may be the plugging of hydraulic fractures in formations that are no longer sufficiently productive.

Although many types, sizes, and shapes of fibers have been used in the art, the performance of these fibers depends mainly on the following parameters: the solids content of the fluids (which generally has had to be high), the fiber concentration (which generally has had to be high, especially to plug wide fractures), and a carefully selected and metered particle-size distribution. The stiff fibers and methods of the invention make these parameters less critical. The fibers and methods of the invention may be used at lower fiber concentrations, and they can be used with less dependence on the solids content and the particle-size distribution of the fluid solids. However, careful attention to these factors results in less spurt and fluid loss than other LCM systems from the art.

The fibers and methods of the invention can be used to plug many fracture widths, without the need to adjust the system variables, and with a variety of pressure drops across the filter cakes formed. The plugs easily sustain high pressure drops without failing. Without being bound by any theory, it is believed that stiff fibers according to the present invention are not dependent on the optimized Packing Volume Fraction (PVF) concept. The PVF concept involves preparing fluids with a multimodal particle-size distribution. The amounts and sizes of particles are chosen such that the solids content in the fluid is maximized, yet the fluid retains acceptable rheological properties. Optimized-PVF cement slurries are exemplified by CemCRETE™ technologies, available from Schlumberger.

For the current invention, the particles are optimized in a way such that they fit within the fiber network. Therefore, the optimal particle-size distribution will not necessarily correspond to an optimized-PVF system, and it may be designed to promote internal plugging by filter cakes either away from the wellbore or at the wellbore face.

Fluid losses are generally classified in four categories. Seepage losses are characterized by losses of from about 0.16 to about 1.6 m$^3$/hr (about 1 to about 10 bbl/hr) of mud. They may be confused with cuttings removal at the surface. Seepage losses sometimes occur in the form of filtration to a highly permeable formation. A conventional LCM, particularly sized particles, is usually sufficient to cure this problem. If formation damage or stuck pipe is the primary concern, attempts must be made to cure losses before proceeding with drilling. Losses greater than seepage losses, but less than about 32 m$^3$/hr (about 200 bbl/hr), are defined as partial losses. In almost all circumstances when losses of this type are encountered, regaining full circulation is required. Sized solids alone may not cure the problem, and fibers are often needed. When losses are between about 32-48 m$^3$/hr (200-300 bbl/hr), they are called severe losses, and conventional LCM systems may not be sufficient. Severe losses particularly occur in the presence of wide fracture widths. As with partial losses, regaining full circulation is required. If conventional treatments are unsuccessful, spotting of LCM or viscous pills may cure the problem. The fourth category is total losses, when the fluid loss exceeds about 32 m$^3$/hr (about 300 bbl/hr). Total losses may occur when fluids are pumped past large caverns or vugs. In this case, fibers and sized solids alone might be ineffective, and the common solution is to employ cement plugs and/or polymer pills, to which fibers may be added for improved performance. An important factor in practice is the uncertainty of the distribution of zones of these types of losses, for example, a certain size fracture may result in severe loss or total loss depending on the number of such fractures downhole.

Without wishing to be bound by any theory, the inventors believe that the mechanism of fibers in helping to form strong filter cakes is based on three aspects:

1. Build/Bridge. The fiber should disperse well enough in the fluid so that it can build or create a fiber mesh network uniformly across the loss zone or zones, for example fracture widths.
2. Plug. The fiber mesh should then be plugged with a blend of solid particles to form a filter cake. The solids blend can optionally be optimized, that is, designed according to the porous structure created by the fibers, the porous structure being a function of the fiber properties, such as aspect ratio and elastic modulus.
3. Sustain. The filter cake of fiber mesh and solids should withstand changes in pressure downhole. Changes in pressure can occur, for example, due to pipe movements or changes in hydrostatic pressure. Erosion may be caused by fluid circulation in the annulus. Ideally, the filter cake should be able to withstand the pressure changes and tangential erosion flow downhole.

The inventors also believe that the solid particles in the fluid plug the porous structure of the mat or mesh created by the contact points where the fibers cross one another. The sizes of the openings between the contact points are a function of the fiber diameter and aspect ratio. Stiff fibers, having an aspect ratio in the range of about 10 to about 300, can create a dense and homogeneous porous structure (mesh) with a large number of contact points, thus reducing the required size of the solid particles that are used to plug the porous structure. The homogeneous mesh formed by stiff fibers does not require the solid particles to have a specific particle-size distribution to form a plug; therefore, the stiff fibers may be used with solids having a wide range of size distributions.

For non-stiff fibers, the porous structures are not well-defined, and experimental results indicate that they do require more specific particle-size distributions. Preferably, the particle size distribution of the solids may be chosen, or the particles already in the fluid can be augmented, to take the porous nature of the fiber mesh into account.

The present inventive system employing stiff fibers and particle blends is useful for curing fluid losses into fissures, natural fractures, and small vugs. The dispersed fibers, homogeneously dispersed or flocculated, dehydrating and coming together into a clump, reduce the permeability of the loss zone or zones by creating a fibrous mesh. Fiber shape, surface properties and stiffness help to determine the extent of dispersion; for example, for a given fiber concentration and aspect ratio, fibers with different shapes and stiffnesses will exhibit different dispersion characteristics.

The fluid solids, including small cuttings if present, are trapped in the pores of the fibrous net. Fibers with larger diameters will form a mesh with larger openings (pores). The fiber flexibility can also have an influence. In addition, fibers having higher aspect ratios generally create a larger number of contact points per individual fiber. Furthermore, "non-stiff" fibers, for example typical multifilament polymer fibers such as those made of polypropylene, are flexible and can bend and overlap with neighboring fibers. This increases the particle diameter required to plug the openings between the contact points. However, stiff fibers (for example, the R1 polyvinyl alcohol fiber described later) do not bend as easily and therefore require fewer or no coarse particles.

The reduced dependence on the particle-size distribution of the solids is an important feature of the invention. Nevertheless, the solid particles preferably comprise a blend of coarse, medium, and fine particles. The coarse particles in the blend preferably have an average particle size above about 180 microns and below about 1000 microns; most preferably they have a particle size of between about 700 and about 850 microns. Particles having an average particle size of between about 30 and about 180 microns, preferably about 150 and about 180 microns, for example about 130 microns, can be used for the medium particles. The fine particles are have sizes below about 30 microns, preferably having an average particle size of from about 10 to about 20 microns. The principal advantage of the fine particles is that they facilitate metering and handling of the blend; alternatively, the fine particles can be left out if the mixing and pumping equipment can handle blends of medium and coarse particles. If fine particles are required and can invade small formation pores, non-damaging particles are preferably used. The optimal ratio of the coarse/medium/fine particles varies, depending on the type of fiber.

The solid particles may be selected by one skilled in the art from one or more members of the list comprising carbonate minerals, mica, rubber, polyethylene, polypropylene, polystyrene, poly(styrene-butadiene), fly ash, silica, mica, alumina, glass, barite, ceramic, metals and metal oxides, starch and modified starch, hematite, ilmenite, ceramic microspheres, glass microspheres, magnesium oxide, graphite, gilsonite, cement, microcement, nut plug and sand. Carbonate minerals are preferred, and calcium carbonate is most preferred. Mixtures of different types of particles may be used. It will also be appreciated that suitable particles are not limited to the list presented above.

Coarse, medium and fine calcium-carbonate particles may have particle-size distributions centered around about 10 microns, 65 microns, 130 microns, 700 microns or 1000 microns, in a concentration range between about 5 weight percent to about 100 percent of the particles. Mica flakes are particularly suitable components of the particle blend. The mica may be used in any one, any two, or all three of the coarse, medium, and fine size ranges described above, preferably in a concentration range between about 2 weight percent to about 10 weight percent of the total particle blend. Nut plug is preferably used in the medium or fine size ranges, at a concentration between about 2 weight percent to about 40 weight percent. Graphite or gilsonite may be used at concentrations ranging from about 2 weight percent to about 40 weight percent. Lightweight materials such as polypropylene or hollow or porous ceramic beads may be used within a concentration range between about 2 weight percent to about 50 weight percent. The size of sand particles may vary between about 50 microns to about 1000 microns. If the particles are included in a cement slurry, the slurry density will preferably bet between about 1.0 to about 2.2 kg/L (about 8.5 to about 18 lb/gal).

Many sizes and shapes of stiff fibers may be used. Stiff cylindrical fibers preferably have an aspect ratio between about 10 and about 300. Stiff rectangular fibers preferably have a thickness between about 20 microns and about 100 microns, a width between about 100 microns and about 450 microns, and a length between about 5 mm and about 24 mm. The Young's modulus of the stiff fibers according to the present invention is important. In fact, it is desirable for the fiber to deform just enough under shear or restriction so that it will not break. On the other hand, in general, fibers with an excessively high Young's modulus cannot resist deformation without rupturing when pumped through restrictions. For example, glass fibers with a Young's modulus of approximately 65 GPa will break into pieces when pumped through restrictions during oilfield treatments.

It is known that sufficient solids concentrations and particular particle sizes are necessary for the fibers to work. In the prior art, the pressure drop is essential to enhance the filtering process, and the fiber-plug performance may change with pressure drop. Thus, having a high solids concentration is one of the important criteria for fibers to work, but optimizing the particle size distribution and solids size is even more critical.

As discussed earlier, the stiff fibers and methods of the invention do not necessarily need coarse particles to plug fractures, and their stiffness plays a very important role in plugging severe fracture widths. For example, stiff fibers can plug 3-mm fractures without coarse particles. This is unique, as prior art fibers, for example glass and polymer monofilament fibers, need 20 volume percent coarse particles with 25 percent total fluid solids content to plug 2-mm fractures. Flexible fibers still cannot plug 3-mm fractures, even with further increases in the coarse-particle concentration.

The use of the stiff fibers and methods of the invention minimizes the necessity of using large-diameter particles to plug larger fracture widths. Stiff fibers work effectively with suitable concentrations of medium particles or with a combination of medium and coarse particles. However, an optional optimized solids blend for a particular type of stiff fiber can provide a solution to the uncertainty of fracture widths and numbers downhole.

Unlike the prior art, the use of the stiff fibers and methods of the present invention extends the solids-concentration boundaries, and the sizes of solid particles that are sufficient to plug certain stiff fiber meshes. The different solid particles and additives present in drilling fluids and cement slurries typically have sizes in the range between about 10 microns and about 1000 microns. The base fluid may be designed in such a way that it contains conventional LCM's, for example multi-modal sizes of particles of calcium carbonate or gilsonite, different sizes of mica flakes or nut plug, etc., and the solids content of the fluid may range from about 10 percent to about 60 percent. With the use of stiff fibers the need for solids optimization is clearly reduced. Stiff fibers are typically monofilaments. Flexible fibers are generally multifilaments for ease of handling, and are sold as tows.

Stiffness is proportional to the Young's modulus of a fiber, and is generally known as the resistance to deformation. Fiber stiffness is one of the main characteristics affecting fiber performance. A simplified approach to characterize fiber resistance is to consider the fiber to be similar to structural beam, bending between two supports on each end. This is illustrated in FIG. 1, showing the deflection of a fiber of length /, deforming under an applied load W.

Several assumptions were used to obtain an estimate of the fiber deflection when exposed to a load. This was a simplified theoretical approach for estimating the strength of a fiber. The assumptions were as follows:

Calculations were based on ambient conditions in air.

The load was the pressure drop acting directly towards the fiber.

The load was uniform over the fiber length.

There was no fiber overlapping.

The load was calculated from the applied pressure (for example 70 gram-force/square millimeters (100 psi) and the fiber surface area exposed to that pressure.

Fiber Deflection:

$$y = \frac{5}{384} \frac{Wl^3}{EI} \qquad (1)$$

Cylindrical Inertia:

$$I_c = \frac{\pi r^4}{4}, \text{ or} \quad (2)$$

$$I_c = 0.0491 d^4 \quad (3)$$

Rectangular Inertia:

$$I_r = \frac{tb^3}{12} \quad (4)$$

W=Weight or force causing the deflection (grams)
E=Modulus of Elasticity (Kg/mm2)
I=Moment of Inertia (mm$^4$)
l=Fracture width (mm)
y=Deflection (mm)
r=Fiber radius (micron)
t=Fiber thickness (mm)
b=Fiber width/breadth (mm)
From the preceding equations, one may derive an expression for calculating "stiffness."

$$S = \frac{Ed^4}{Wl^3}, \text{ where} \quad (5)$$

S=stiffness.
These equations may be applied to fibers of regular or irregular cross-sectional shape; as an example the calculation for fibers having circular cross sections is given below.

The deflection is proportional to 1/stiffness, and the W and l in Eq. 1 were kept constant for all the fibers and the stiffness was thus calculated. Table 1 presents "stiffness factors," defined as the ratio of the stiffness of a given fiber to the stiffness of a glass fiber (GL) used in experiments that will be described later in the Examples section. The glass fibers had a Young's modulus of 65 GPa, a 20-micron diameter and were 12 mm long. The nature of the polypropylene (FM), nylon (NL) and crosslinked-polyvinyl alcohol (R1 and R2) fibers will also be described later in more detail. The calculation of the stiffness or stiffness factor for the rectangular fiber is the same as for the circular fibers, except that the inertia rectangle expression (Eq. 4) would be used.

parison is not limited to circular and rectangular fibers, but can be extended to fibers with other types of cross section.

Higher relative humidity and temperature adversely affect fiber stiffness. Stiff or, to some degree, thicker fibers help create a good mechanical barrier or anchor in a fracture. In addition, particles or flexible fibers, preferably optimized in size and/or shape, effectively reduce the pore sizes between the stiff fibers. It is important to note that a "stiff" fiber is not necessarily a hard or mechanically strong fiber. Suitable stiff fibers can have a Young's modulus of from about 0.5 to about 100 GPa. Preferred stiff fibers have a Young's modulus between about 1.0 and 80 GPa, and most preferably from about 1.5 to about 4 GPa. Such fibers (for their length and diameter) will be flexible enough to bend without breaking under oilfield conditions. Polymers such as polypropylene, nylon, and polyvinyl alcohol may fall within this range. In general, combination of low Young's modulus and larger diameter, hence higher surface area than micron-diameter fibers, is highly preferred if the length is suitable.

Multifilament or bundled glass fibers of typical diameters are not suitable, because of the high Young's modulus of glass, typically from 50 to 90 GPa. Glass is brittle, not flexible, and cannot withstand higher pressures across a fiber mesh. For example a pressure differential of 3.45 MPa (500 psi) will rupture the glass fibers. "Flexible mono-filament" fibers are not brittle, but are generally not stiff enough because their diameters are typically in the 10 to 80 micron range. They are extremely flexible, and tend to deform excessively and fail under high test pressures. On the other hand, it should be borne in mind that bundles of fibers may have properties different from individual fibers. For example, a bundle of several micron-sized flexible polypropylene fibers bonded together in a single strand may be a "stiff" fiber of the invention.

In a preferred embodiment, two (or more) different fibers may be used in the invention. At present, they will be termed primary and secondary fibers. The primary fibers must be stiff fibers, but may be of any composition that provides suitable properties. The secondary fibers may be any fibers, stiff or not. When properly chosen, the primary and secondary fibers may act synergistically. Stiff fibers preferably have lengths between about 5 mm and about 24 mm, most preferably from about 6 to about 20 mm. Stiff fibers of the invention include (but are not limited to) materials such as polypropylene, nylon, glass, Kevlar™, and crosslinked polyvinyl alcohol. They are commercially available in different diameters and shapes. The specific gravity of stiff fibers is preferably

TABLE 1

Stiffness Estimation

| Fiber | Material | Diameter/thickness (um) | E (Kg/mm2) | Stiffness factor |
|---|---|---|---|---|
| 1. GL - 20 microns | Alkaline resisted glass | 20 | 6628.16 | 1.000 |
| 2. FM - 45 microns | Polypropylene | 45 | 152.96 | 0.591 |
| 3. NL - 150 microns | Nylon | 150 | 203.94 | 97.356 |
| 4. NL - 250 microns | Nylon | 250 | 203.94 | 751.202 |
| 5. NL - 280 microns | Nylon | 280 | 203.94 | 1182.031 |
| 6. FM - 12.5 microns | Polypropylene | 12.5 | 152.96 | 0.004 |
| 7. NL - 50 microns | Nylon | 50 | 203.94 | 1.202 |
| 8. R1 | Crosslinked Polyvinyl alcohol | 80 | 2957.18 | 1014.818 |
| 9. R2 | Crosslinked Polyvinyl alcohol | 100 | 2549.29 | 240.385 |

It is believed that fibers with stiffness factors from about 2 to about 400,000 are suitable, preferably between 4 to 12,000; and most preferably between 80 to 2,500. The stiffness combetween about 0.90 and about 1.5, although denser materials may be used, for example certain metal ribbons like iron or aluminum alloys.

The secondary fiber may be an organic or synthetic type of fiber, for example with a Young's modulus between about 0.5 GPa and about 100 GPa, preferably 0.5 GPa to 10 GPa. The fiber diameter may be between about 10 microns and about 100 microns, preferably about 10 microns to about 50 microns. The fiber length may be between about 5 mm and about 24 mm, preferably from about 6 mm to about 20 mm. Examples of secondary fibers include (but are not limited to) polypropylene, novoloid, Kevlar™ glass, nylon, polyamide, polylactic resin, polyvinyl alcohol, polyester, and cellulose.

The primary and secondary fibers may be of any fiber shape, for example, round, cylindrical, ribbon-like flat, coil-like spiral, trilobe, star shape, disoriented or irregular. Secondary fibers may also be fibrillated. The secondary fibers may also be reactive fibers that can form a sticky fibrous net at certain temperatures, for example polyvinyl alcohol or polylactic resin.

A suitable total fiber concentration is in the range between about 2.85 and about 42.8 kg/m$^3$ (about 1 and about 15 lbm/bbl), preferably from about 5.7 to about 22.8 kg/m$^3$ (about 2 to about 8 lbm/bbl). The suitable ratio of primary to secondary fibers is between about 95/5 and about 30/70 by fiber volume, more preferably from about 90/10 to about 50/50.

The primary and secondary fibers do not necessarily need to have two different chemical compositions. For example, nylon having a Young's modulus of 4 GPa and a diameter of 150-400 microns can be the primary (stiff) fiber, and flexible multifilament nylon fibers with a diameter of 50 microns can be the secondary fibers.

There are many benefits of fiber blends. They are compatible with a wider range of particles, in other words, they are less sensitive to the PSD of the plugging particles. They create a unique plug because the flexible fibers invade the fracture and thus anchor the plug, providing much better stability in terms of resisting erosion. Finally, the incorporation of flexible fibers (in this case, thin fibers) also helps to suspend the thicker, stiff fibers that otherwise could not be used alone because they would settle during injection.

The nature of the filter cake must also be considered. One of the problems with filter cakes, even those including fibers, is that fluid circulation can erode the surface of the filter cake by tangential flow. However, with a well-tuned system, stiff fibers can cause the plug to form internally, rather than at the entrance to the fracture, so that erosion cannot happen. However, high fiber concentrations can pose operational issues at the rig site, for example plugging of mixing equipment, or pump cavitation. The stiff-fiber concentration used in the field should be between about 2.85 kg/m$^3$ and about 28.5 kg/m$^3$ (about 1.0 lbm/bbl and about 10.0 lbm/bbl), without increasing the apparent viscosity of the fluid and compromising fluid pumpability.

To address lost-circulation effectively, it is highly preferred that the fibers follow the earlier-described three-step mechanism to build a filter cake. In fact, a failure in any part of this three-step process can result in a plug failure. Fiber characteristics such as stiffness play a vital role in plug performance. Stiff fibers resist more pressure with a smaller deflection, can build a structure corresponding to the fracture width, and trap optimized solids. Having stiff primary fibers can also provide mechanical anchoring to other (secondary) fibers when both are used. It is equally important for the stiff fibers (for example having diameters in the range of about 80 microns to about 450 microns) to have a sufficiently low Young's modulus that they can be pumped through small restrictions while minimizing any breakage or blockage concerns.

The inventors have established that, for a given type of fiber or fiber blend, increasing the fiber concentration improves the efficiency of fluid-loss control. In addition to increasing the fiber concentration to achieve better fluid loss control, the Solid Volume Fraction (SVF) of the particles in the fluid may also be increased, i.e. adding more sized solids, to improve the fluid control efficiency. Alternatively, increasing the particle size of the added solids may also improve the overall efficiency of fluid-loss control. Note that it would be necessary to ensure that the overall particle-size distribution of the added particles was still in the suitable working range; otherwise, simply increasing the particle size would not result in increased efficiency. Plate-like materials may also be used to better control the fluid loss.

The inventors have also established that, for a given fiber or fiber blend, the particle-size distribution (PSD) of the added particles governs the permeability of the plugged fiber network. The selection of the proper PSD of the added particles is based on the pore-size distribution of the fiber network, and therefore depends on structural parameters of the fibers. However, even if the PSD of the particles is properly engineered, then an adequate concentration of particles in the fluid is still needed in order to achieve fluid-loss control. As previously mentioned, the optimal PSD range depends on the structure of the fibers. For example, when thinner and more flexible fibers are used, addition of coarser particles is needed to control the fluid loss. There is a minimum solids volume fraction (SVF) in the fluid for the fibers to be effective. For a given fiber system, any SVF above the minimum is suitable. The suitable SVF is between about 8 and about 50 percent, and is preferably between about 15 and about 35 percent. The fluid pumpability might become problematic if the SVF exceeds these limits.

The stiff fibers and solids are added to the drilling fluid (mud) in any order and with any suitable equipment to form the treatment fluid. If the fluid already contains some or all of the solids necessary to form a filter cake on the mesh of stiff fibers, this is taken into account. Typically, the fluid containing the fibers and solids is mixed before pumping downhole. The fibers can be added and mixed and then the solids added and mixed, or vice versa, or both fibers and solids can be added before mixing. It may be determined that one of the components aids in the suspension and/or dispersion of the other, in which case the helpful component is mixed into the fluid first. Typically, the treatment fluid is weighted to approximately the same density as the fluid previously injected into the well. This practice minimizes migration of the treatment fluid and helps prevent mixing with the previously injected fluid. A weighting material may optionally be added to the fluid, the fibers, or the solids at any point. The treatment fluid can be added in a discrete amount, for example as a pill, or can be added continuously until lost circulation or fluid loss is satisfactorily reduced. The treatment fluid may be spotted adjacent to the location of the lost circulation, if known, by methods known in the art.

The fluid containing the mixture of stiff fibers and solids may be injected in several stages, in which the relative amounts of solids and fibers varies from stage to stage. Optionally, the stiffness of the stiff fibers may initially be less than optimal and then be increased to a suitable stiffness during the treatment. For example the concentration of stiff fibers can be selected in the range of zero to a lower-than-optimal concentration of stiff fiber in the first stage or stages of the treatment. A suitable low concentration can be determined by measuring the minimal effective concentration of the stiff fiber necessary to form a mesh across a specific fracture size and then using a concentration in the range of from about 10 to about 90 percent of that minimal effective blocking concentration. The selected low concentration should be tested in the same equipment to validate the non-blocking effect of the treatment. The treatment with a low concentration of the stiff fiber is followed by a treatment with an effective concentration of stiff fibers capable of rapid blockage. Effective concentrations can be determined by experiments described later. As a result, treatment with the effective concentration blocks the fracture at or near the wellbore, and the low concentration stiff fiber plugs the fracture at a bottleneck deeper in the fracture.

In another case, in addition to a change in the stiff fiber concentration, the amount and/or size distribution of the plugging solid particles may also be decreased. In general, whenever any changes are made in the concentration or nature of the fibers, the concentration and particle-size distribution of the plugging solids should be re-evaluated. The low-concentration treatment may be designed in such a way that it blocks certain fracture sizes smaller than the original fracture size. For example, the initial low-concentration treatment may be designed to treat a 1-mm fracture, and the following treatment may be designed to treat a 4-mm fracture. For a 1-mm fracture, using zero to a low concentration of stiff fibers may be sufficient. When any of these strategies is followed, the treatment forms blockages at one or more different depths in a fracture or in pores. One blockage may be close to or at the wellbore and another deeper in the fracture or pores.

Particularly, in the cases of severe or total losses, the stiff fibers and methods of the invention may be used as a pre-treatment before a more consolidated treatment. This use as a pre-treatment decreases the total cost, decreases damage to the formation, decreases further problems that may otherwise appear because of delays in treatment, and increases the chances of an effective first placement of the secondary treatment (such as a cement plug or a reactive pill). Thus, the stiff fibers and methods of the invention may be used in a first (primary) treatment for a temporary cure of severe or total losses. For greater assurance of a permanent and complete treatment, it is convenient for a driller then to place a second treatment, such as a viscous pill or a cement plug. In that case the composition and method assure that the second treatment is effective.

A suitable blend of stiff fibers and solids is selected for a given fluid and given conditions, such as but not limited to the fluid type, the bottom hole temperature and the extent of losses being experienced. An effective concentration of each component, or a range of effective concentrations, may be identified by performing experiments such as those described below. Similarly, suitable compositions of solid particles and stiff fibers, and suitable particle size ranges and fiber size and stiffness may be identified by performing experiments such as those described below.

EXAMPLES

The present invention can be further understood from the following examples.

Experimental

Experiments were primarily performed with four different bentonitic water-based muds. The density varied from 1.44 to 1.55 kg/L (12 to 12.9 lbm/gal), and the solids content varied from 18 weight percent to 30 weight percent. The water-based fluid formulations are shown in Tables 2 to 5. PV is the plastic viscosity, and Ty is the dynamic shear stress for Bingham fluids. Different formulations were prepared to observe the effect of solids loading on the fiber performance. Calcium carbonate was used as a lost-circulation material and barite as a weighting agent.

Figure 2:
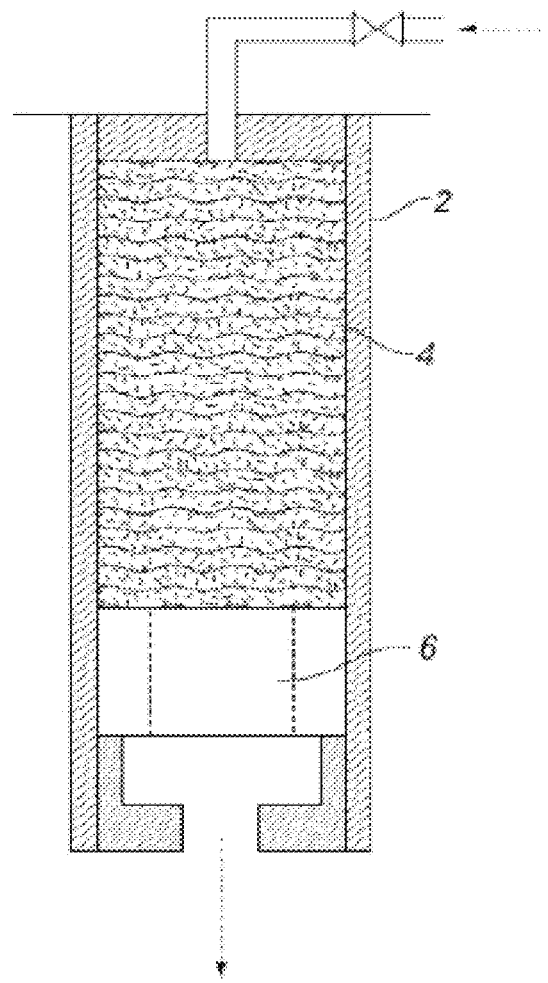
FIG. 2 shows the modified fluid loss cell used.
Figure 3:
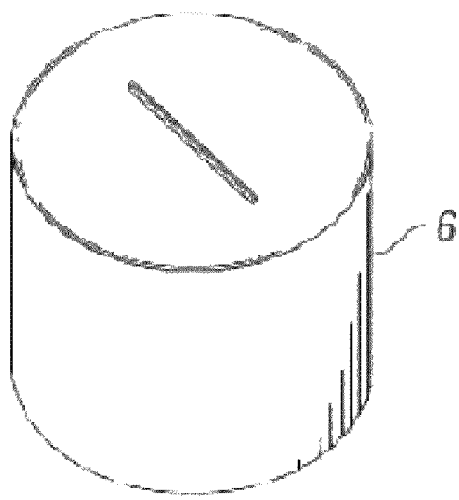
FIG. 3 illustrates one form of slot used.

Most of the tests were performed in a modified lost circulation cell, shown in FIG. 2. The cell was equipped with modified slits through a grid, or a cylinder approximately 50 mm high having either a 1 mm to 3 mm slot or 1 mm to 3 mm holes. FIG. 3 shows the arrangement with a slot. The experimental apparatus consisted essentially of a high-pressure high-temperature fluid loss cell 2 that is equipped with the cylinder 6 at the bottom. Pressure was applied from the top of the cell onto fluid 4 placed in the cell (as in traditional fluid-loss experiments). A valve at the bottom was closed, and a grid or cylinder having a slot or holes was placed inside the cell. 300 mL of fiber-laden fluid was poured into the test cell, and the cell was closed and pressurized to 0.69 MPa (100 psi) to simulate the differential pressure at two ends of a fracture. Once the cell was pressurized, the bottom valve was opened quickly enough to eliminate filtration of fibers through the bottom pipe. If the grid was plugged, then the pressure was increased from 0.69 MPa (100 psi) to 3.45 MPa (500 psi), in steps of 0.345 MPa (50 psi). The pressure increase was purposely introduced to verify the strength of the filter cake. The pressure was held constant for at least 30 minutes, unless no plug formed or the plug failed. Mud loss monitored by collecting filtrate in a container. The container was placed on a balance connected to a computer, allowing one to record fluid loss over time.

During some experiments, the fibers were able to plug the slots at low pressure; however, as soon as the pressure was increased, the plug failed and the fluid inside the cell came out. If at any time the plug failed, the test was stopped and the results were recorded.

A few tests were also performed applying 3.45 MPa (500 psi) pressure immediately. These experiments were intended to evaluate the fiber system's plugging behavior when suddenly exposed to higher downhole pressures, for example surge and swab pressures, or to a loss zone situation with an annular pressure of 3.45 MPa (500 psi) due to the hydrostatic column.

The bentonite particle size ranged from about 10 to about 100 microns. The "fine" calcium carbonate, hereinafter sometimes designated as the "10 micron" material, was about 10 percent smaller than about 1.1 microns, about 50 percent smaller than about 8.6 microns, and about 90 percent smaller than about 27 microns. The "medium" calcium carbonate, hereinafter sometimes designated as the "130 micron" material, was about 10 percent smaller than about 15 microns, about 50 percent smaller than about 138 microns, and about 90 percent smaller than about 302 microns. The "coarse" calcium carbonate, hereinafter sometimes designated as the "1000 micron" material, was about 10 percent smaller than about 9.5 microns, about 50 percent smaller than about 1026 microns, and about 90 percent smaller than about 1500 microns.

TABLE 2

Bentonite Water-Based Mud Formulation 1

|  | Component | kg/m$^3$ | lbm/bbl |
|---|---|---|---|
|  | Water | 815 | 285 |
| Viscosifier | Bentonite | 51 | 18 |
| Weighting Agent | Barite | 342 | 119 |
| Lost Circulation Material 1 | CaCO$_3$ - 130 m | 171 | 60 |

TABLE 2-continued

Bentonite Water-Based Mud Formulation 1

| | Component | kg/m³ | lbm/bbl |
|---|---|---|---|
| Lost Circulation Material 2 | CaCO₃ - 10 m | 57 | 20 |
| Density: lb/gal [SG] | 12.00 [1.43] | | |
| Solid Volume Fraction (SVF) (vol %) | 18 | | |
| PV (Pa-s) | 22 | | |
| Ty [Pa (lb/100 ft²)] | 8.6 (18) | | |
| 10 sec Gel | 22 | | |
| 10 min Gel | 34 | | |
| API Fluid Loss | 12 mL after 30 min | | |

TABLE 3

Bentonite Water-Based Mud Formulation 2

| | Component | kg/m³ | lbm/bbl |
|---|---|---|---|
| | Water | 747 | 261 |
| Viscosifier | Bentonite | 60 | 21 |
| Weighting Agent | Barite | 200 | 70 |
| Lost Circulation Material 1 | CaCO₃ - 1000 m | 130 | 45 |
| Lost Circulation Material 2 | CaCO₃ - 130 m | 383 | 134 |
| Density: lb/gal [SG] | 12.56 [1.50] | | |
| Solid Volume Fraction (SVF) (vol %) | 25 | | |
| PV (Pa-s) | 70 | | |
| Ty [Pa (lb/100 ft²)] | 13.4 (28) | | |
| 10 sec Gel | 22 | | |
| 10 min Gel | 45 | | |
| API Fluid Loss | 21 mL after 30 min | | |

TABLE 4

Bentonite Water-Based Mud Formulation 3

| | Component | kg/m³ | lbm/bbl |
|---|---|---|---|
| | Water | 747 | 261 |
| Viscosifier | Bentonite | 60 | 21 |
| Weighting Agent | Barite | 350 | 122 |
| Lost Circulation Material 1 | CaCO₃ - 1000 m | 60 | 21 |
| Lost Circulation Material 2 | CaCO₃ - 130 m | 336 | 117 |
| Density: lb/gal [SG] | 12.9 [1.54] | | |
| Solid Volume Fraction (SVF) (vol %) | 25 | | |
| PV (Pa-s) | 42 | | |
| Ty [Pa (lb/100 ft²)] | 15.3 (32) | | |
| 10 sec Gel | 24 | | |
| 10 min Gel | 52 | | |
| API Fluid Loss | 21 mL after 30 min | | |

TABLE 5

Bentonite Water-Based Mud Formulation 4

| | Component | kg/m³ | lbm/bbl |
|---|---|---|---|
| | Water | 742 | 259 |
| Viscosifier | Bentonite | 60 | 21 |
| Weighting Agent | Barite | 198 | 69 |
| Lost Circulation Material 1 | CaCO₃ - 130 m | 510 | 259 |
| Density: lb/gal [SG] | 12.56 [1.50] | | |
| Solid Volume Fraction (SVF) (vol %) | 25 | | |

TABLE 5-continued

Bentonite Water-Based Mud Formulation 4

| | Component | kg/m³ | lbm/bbl |
|---|---|---|---|
| PV (Pa-s) | 36 | | |
| Ty [Pa (lb/100 ft²)] | 12.5 (26) | | |
| 10 sec Gel | 24 | | |
| 10 min Gel | 48 | | |
| API Fluid Loss | 21.2 mL after 30 min | | |

Seven fibers were used for most of the performance comparisons. The seven fibers were two crosslinked polyvinyl alcohols (hereinafter designated R1 and R2), either of two multifilament polypropylene fibers (hereinafter designated FM), two nylon fibers (hereinafter designated as NL), and a glass fiber (hereinafter designated GL).

R1 was a non-water-soluble polyvinyl alcohol material in a flat shape (KURALON™ RF400 fiber available from Kuraray, Osaka, Japan). The length was about 12 mm, the width was about 350 microns, and the thickness was about 80 microns. The melting point was greater than 200° C., and the Young's modulus was 29 GPa.

R2 was also a non-water-soluble polyvinyl alcohol (KURALON™ RECS100 fiber available from Kuraray, Osaka, Japan). The diameter was about 100 microns. The melting point exceeded 200° C., and the Young's modulus was 25 GPa. The fiber length was 12 mm.

The two FM fibers were also non-water-soluble. Both had a melting point of 328° F. (164° C.). One fiber product was 12 mm long 45 microns in diameter (FIBERMESH™ 150-12, available from Propex, Inc., Chattanooga, Tenn., USA). The other fiber product was 19 mm long and 12.5 microns in diameter (SPECTER™ fiber, available from PGI Performance Concrete Fibers, Kingman, Kans., USA). Both were coated with less than 1 percent each of a proprietary coating and a lubricant.

The GL fiber was about 12 mm in length and about 20 microns in diameter, and was obtained in tows of around 100 fibers packed together (CEMFIL™, supplied by Owens Corning, Toledo, Ohio, USA).

The NL fibers are available from DuPont, Wilmington, Del., USA under the trade name TYNEX™. Another supplier is Rhodia Polyamide, Saint Fons, FR, under the tradename PA66™. The fibers have different densities; therefore, to make comparisons between equal volumes of fibers, the fiber concentrations were varied in such a way as to keep the fiber volume constant during the comparisons. The weight concentrations required for equal volumes of some of the fibers are shown in Table 6.

TABLE 6

Number of Fibers Based on Fiber Volume

| Fiber | Single Fiber Vol (mL) | Fiber Conc. kg/m³(lbm/bbl) | Total Fiber vol. Based on Fiber Conc. (mL) | Total Number of Fibers in 1.68 mL |
|---|---|---|---|---|
| GL | 3.77E−06 | 14.27 (5.00) | 1.68 | 445860 |
| FM | 2.36E−05 | 22.74 (1.79) | 1.68 | 71338 |
| R1 | 3.36E−04 | 7.47 (2.62) | 1.68 | 5000 |
| R2 | 9.42E−05 | 7.47 (2.62) | 1.68 | 17834 |
| NL | 9.77E−04 | 6.15 (2.16) | 1.68 | 1718 |

Example 1

Comparison of GL, FM, and R1+R2 with 2 mm Holes

Figure 4:
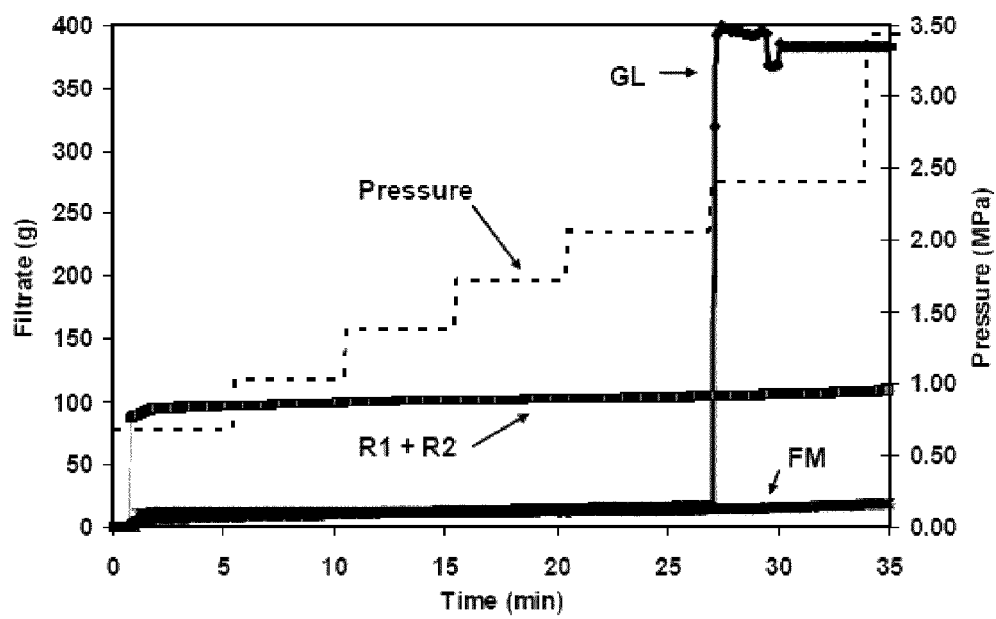
FIG. 4 shows a comparison of fibers tested with 2-mm holes.

A series of tests was performed with the apparatus described in FIG. 2, fitted with 2-mm holes. The following fiber systems were tested: GL, FM and a 50:50 mixture by volume of R1 and R2 fibers (hereinafter designated as R1+R2). The fibers were mixed into the fluid formulation of Table 2, but without the coarse (1000 micron) calcium carbonate. To compare equal volumes of fibers, the overall fiber volume was 1.68 mL in 300 mL of base fluid. The results are presented in FIG. 4.

GL initially performed well. Low spurt was observed, and the filter cake provided good fluid loss control up to about 25 minutes. However, once the pressure rose to 2.41 MPa (350 psi), the filter cake failed. The R1+R2 fiber system had a relatively high spurt—almost 100 mL. However, following the spurt, the filter cake provided good fluid-loss control throughout the 30-min test. The FM system performed well: low spurt and good fluid-loss control throughout the 30-min test up to 3.45 MPa (500 psi)

Example 2

Comparison of GL, FM, and R1+R2 with 2 mm Slot

Figure 5:
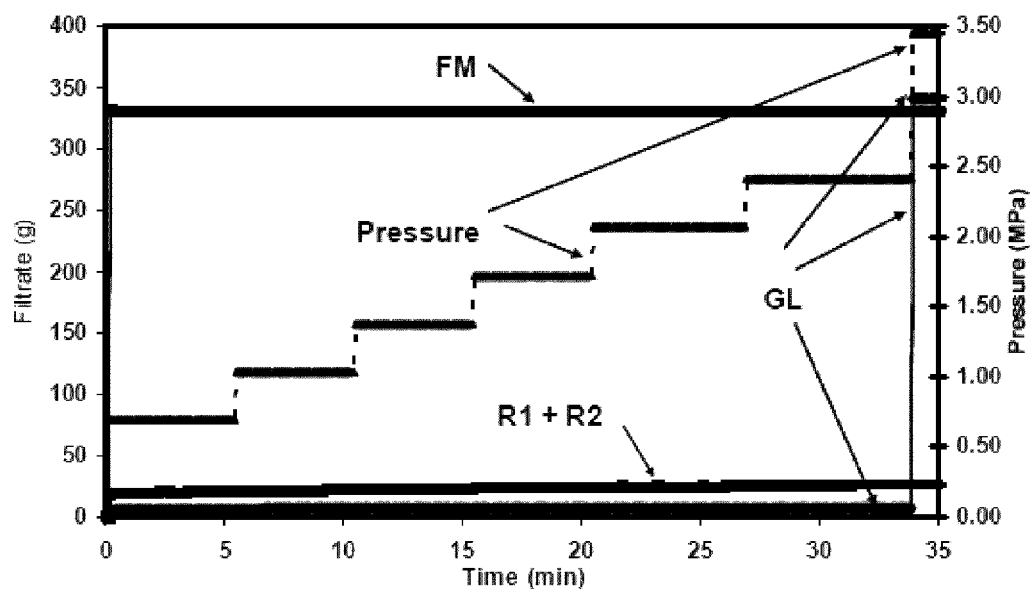
FIG. 5 shows a comparison of fibers tested with a 2-mm slot.

The experiments of Example 1 were repeated, this time with the fluids exposed to a 2-mm slot. Like Example 1, the overall fiber volume was 1.68 mL in 300 mL of base fluid. The results are presented in FIG. 5.

The GL system demonstrated the lowest spurt. Excellent fluid-loss control was maintained until the pressure was raised from 0.69 MPa to 3.45 MPa. The GL plug failed and all the fluid exited the apparatus.

The R1+R2 system began with 19 g spurt and showed only 26 g fluid loss after 30 minutes. Unlike Example 1, the FM system was an instant failure at 0.69 MPa (100 psi). The total flow area for the 2 mm holes compared to the 2 mm slot was 3:1. The spurt for R1+R2 and for the GL fibers was also approximately 3:1 between the 2 mm holes and the 2 mm slot. FM is a highly flexible fiber, not a stiff fiber. It performed very well in the 2 mm holes, but failed to build a fiber mesh in the 2 mm slot.

Example 3

Comparison of GL+Mica, and FM+Mica, with 2 mm Slot

Figure 6:
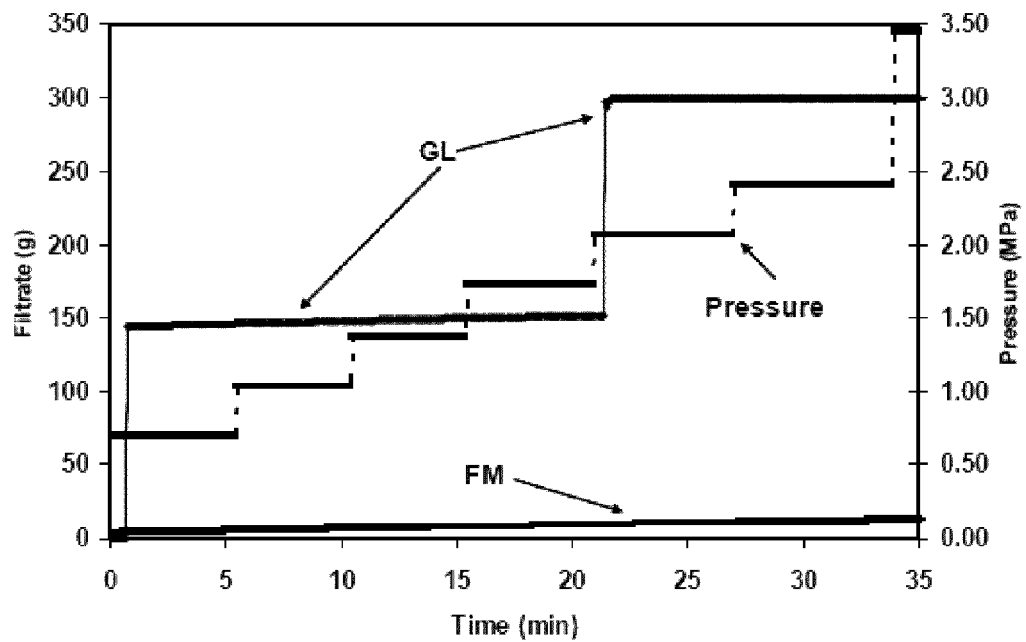
FIG. 6 shows results with fibers plus mica with a 2-mm slot.

This experiment compared the fluid-loss performance of a fluid containing both fibers and mica. The base fluid was the composition of Table 5. The apparatus described in FIG. 2 was fitted with a 2-mm slot. The results are presented in FIG. 6

One 300-mL fluid contained 1.34 mL of GL fibers and 2.36 mL of mica. Notice that the amount of fiber was lower than the previous examples. This composition corresponds to 20 wt % fiber and 80 wt % mica, and is hereinafter designated as GL+mica.

The other 300-mL fluid contained 1.34 mL of FM fibers and 2.36 mL of mica. Again, this composition corresponds to 20 wt % fiber and 80 wt % mica, and is hereinafter designated as FM+mica.

Both fiber/mica systems could plug the 2 mm slot, but the GL+mica-system plug allowed a very high spurt, and then could not resist high pressure and lost its strength when the pressure changed from 1.72 MPa (250 psi) to 2.07 MPa (300 psi). The FM+mica system allowed much less spurt, and the fluid-loss rate was slow thereafter.

Example 4

Plug Comparison of GL, FM, and R1+R2 with 3 mm Slot

Figure 7:
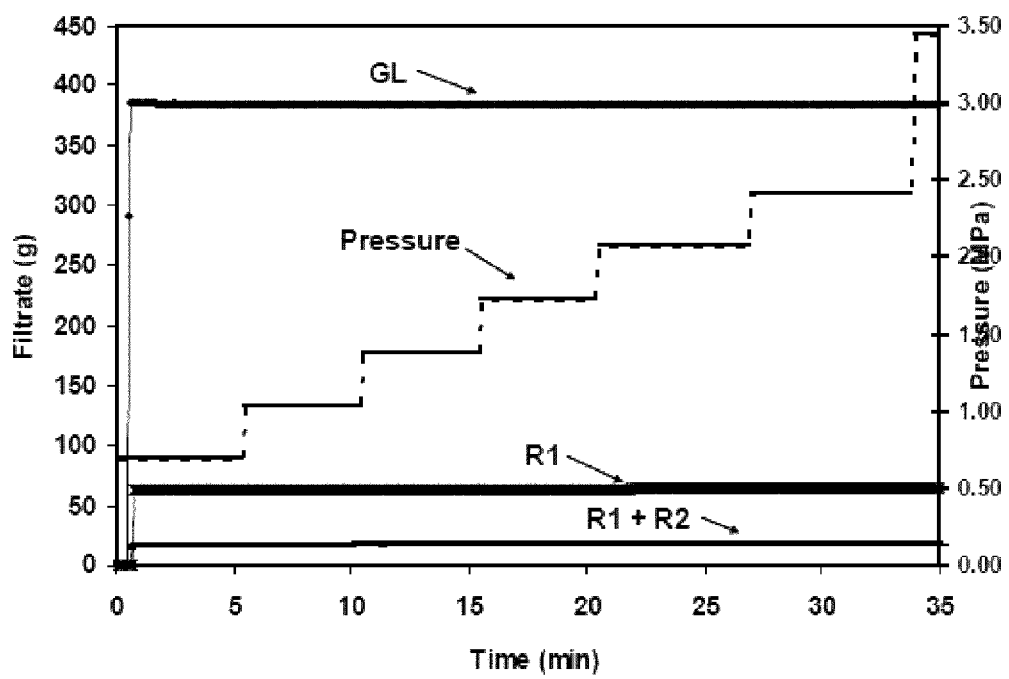
FIG. 7 shows a comparison of fibers tested with a 3-mm slot.

A series of tests was performed with the apparatus described in FIG. 2, fitted with a 3-mm slot. The following fiber systems were tested: GL, FM, R1+R2 and R1 alone. The fibers were mixed into the fluid formulation of Table 4. To compare equal volumes of fibers, the overall fiber volume was 1.68 mL in 300 mL of base fluid. The results are presented in FIG. 7.

Neither the GL nor the FM systems could plug the slot at 0.69 MPa (100 psi) pressure drop, but R1+R2 system plugged slot with a spurt of 15 g and a total fluid loss of 17 g after 35 min. R1 could plug the 3 mm slot alone, albeit with a larger spurt.

Not shown, is that either R1 or R2 alone could each plug the 2-mm slot, using the fluid formulation of Table 5.

The plug failures of GL systems at intermediate pressures are consistent with the aforementioned theory of fiber stiffness. The stress on the fiber at the higher pressures exceeded the fiber's capacity, and the fiber could not sustain the higher pressures. An additional reason behind the GL failure may be the fiber's inability to build a fiber mesh over the fracture width. A failure in any part of the process of building a mesh, plugging the mesh with particles, or sustaining the plug, results in failure.

Example 5

Plug Comparison GL, FM, and R1+R2, with Pressure-Drop Changes

Two series of tests were performed with the apparatus described in FIG. 2, fitted with a 2-mm slot. The experiments tested filter-cake strength versus pressure. One series involved subjecting the fiber-laden fluids to a 3.45 MPa (500 psi) pressure-drop instantly. The other series involved incremental 0.69-MPa (100-psi) pressure increases to 3.45 MPa. The test duration was 35 min.

Figure 8:
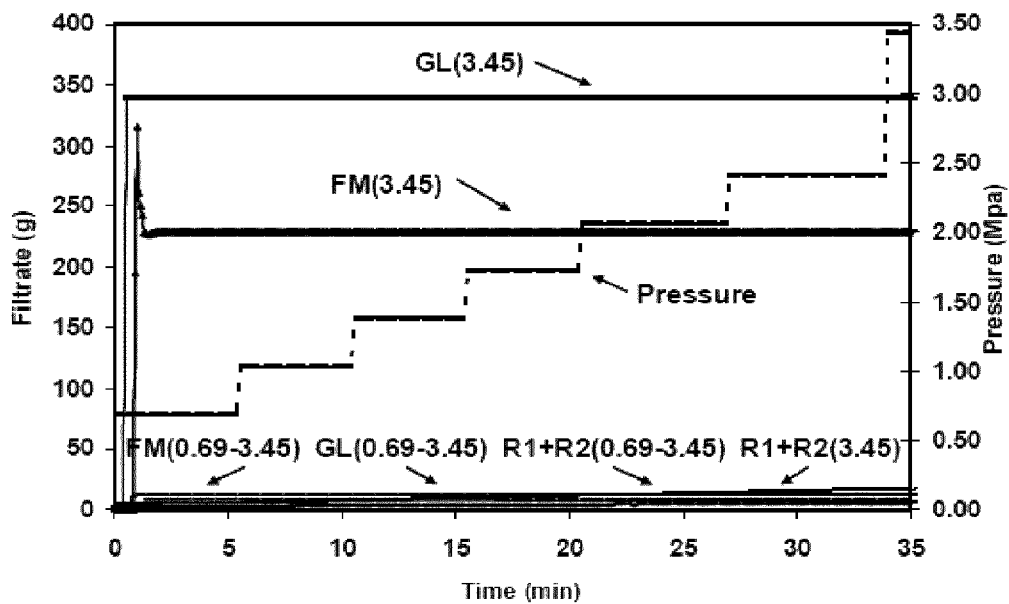
FIG. 8 shows the effect of rate of pressure application a with 2-mm slot.

The following fiber systems were tested: GL, FM and R1+R2. The fibers were mixed into the fluid formulation of Table 3. To compare equal volumes of fibers, the overall fiber volume was 1.68 mL in 300 mL of base fluid. The results are presented in FIG. 8. In the figure labels, the "0.69-3.45" designation identifies systems that underwent the incremental pressure increases. The "3.45" designation means that the system underwent an instantaneous exposure to 3.45 MPa pressure drop.

When pressure was increased in 0.69 MPa increments, the GL system survived all the way to 3.45 MPa. The recorded spurt was 4 g and the total fluid loss was 17 g. This result was better than a similar experiment (presented in Example 2) involving a fluid without coarse particles. However, when the pressure was raised directly to 3.45 MPa, the GL system failed instantly.

Similar behavior was observed with the FM system. It could plug the 2-mm slot and provide fluid-loss control when exposed to 0.69 MPa (100 psi) pressure drop increments up to 3.45 MPa. The spurt was 2 g and the total fluid loss was 7 g after 35 min. However, when the pressure was raised directly to 3.45 MPa, the FM system failed instantly.

The R1+R2 system could plug the 2-mm slot and provide fluid-loss control when exposed to 0.69 MPa (100 psi) pressure drop increments. The spurt was 10 g and the total fluid loss was 12 g after 35 min. However, unlike the GL and FM systems, the R1+R2 system also provided fluid-loss control when the pressure was raised directly to 3.45 MPa. The spurt was 5 g and the total fluid loss was 8 g after 35 min. The success of the R1+R2 system is attributable to the fibers' stiffness and ability to resist the pressure.

Example 6

Plug Comparison of GL, FM, and R1+R2 with 3-2-1 mm Slot with Immediate 3.45 MPa (500 psi)

Tests were performed with the apparatus described in FIG. 2, fitted with a grid having 1-mm, 2-mm and 3-mm slots. The fiber laden fluids were exposed to an immediate 3.45-MPa pressure drop. This experiment was designed to show the performance of fibers when exposed to the real situation of multiple fracture widths. The fluid was the formulation presented in Table 3.

1.68 mL of GL, FM, or R1+R2 in 300 mL of base fluid could not plug the 3-2-1-mm slot. The test was repeated with 2.68 mL of GL, FM, or R1+R2. Only the R1+R2 system was successful.

Figure 9:
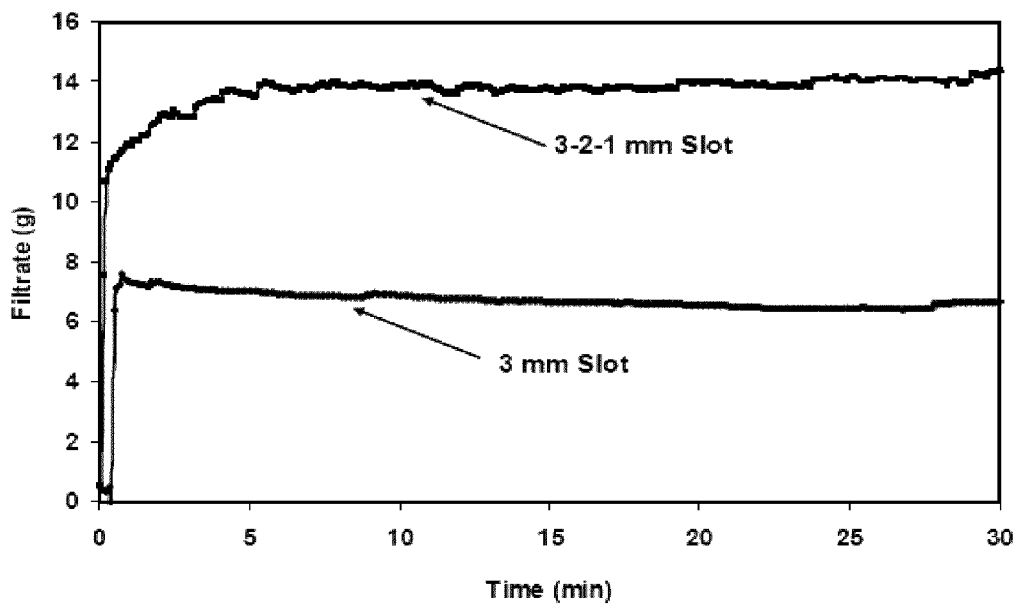
FIG. 9 compares results with one fiber and a grid with a 3-mm slot or a grid with three slots (3, 2, and 1 mm).

Another test was performed with 2.68 mL R1+R2 fiber; however, the test apparatus was fitted with a 3-mm slot only. As shown in FIG. 9, the fluid performed better without the multiple-slot-size grid.

One series was carried out with 2.68 mL of R1+R2 fiber. As shown in FIG. 9, the system did not perform as well when tested against multiple slot sizes.

Example 7

Fiber Laden Fluid Effectiveness at Lower SVF

Most of the previous examples have involved fluids with a 25 percent SVF. This series involved the fluid formulation shown in Table 2, which has an SVF of 18 percent. During these tests the apparatus was fitted with a 2-mm slot, 2-mm holes or a 3-mm slot.

Figure 10:
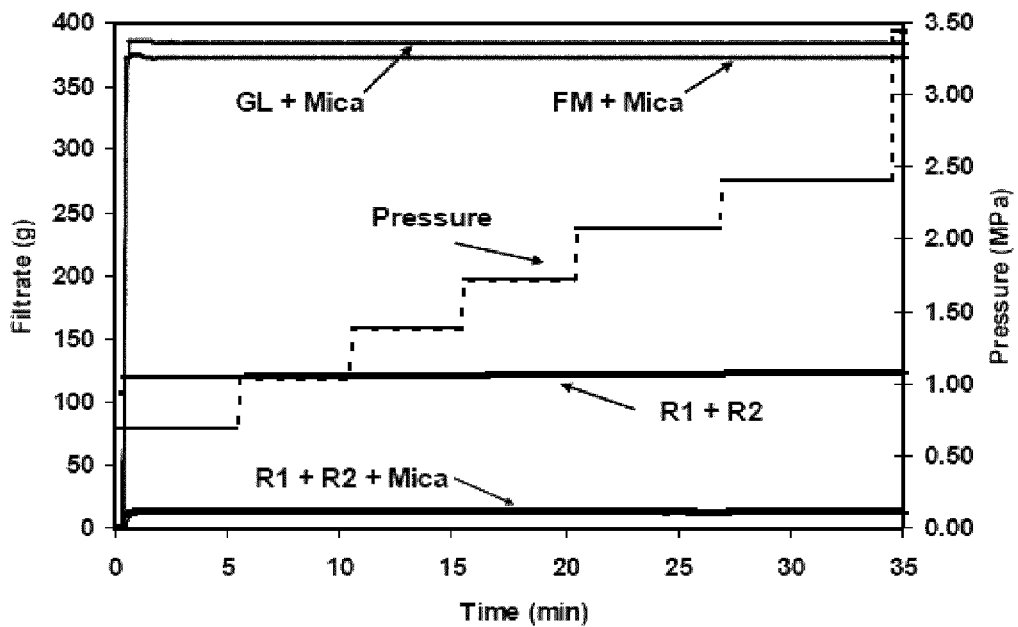
FIG. 10 shows a comparison of fibers with a 2-mm slot in a fluid of lower Solids Volume Fraction.

The plugging behavior of R1+R2 fibers in a 25 percent SVF fluid has been previously presented. For the reduced-SVF fluid tests, An R1+R2 system with a fiber concentration equivalent to 13.0 kg/m$^3$ (5.0 lbm/bbl) GL could plug both the 2 mm hole and the 2 mm slot. This concentration corresponded to 2.24 g of fiber in 300 mL of base fluid. The performance of the R1+R2 system with the 2-mm slot is shown in FIG. 10. The spurt was 119 g and the total fluid loss was 122 g after 35 min.

The same tests were performed with GL and FM systems. GL fibers were added at a concentration of 4.27 g/300 mL base fluid, and the FM fibers were added at a concentration of 1.53 g/300 mL base fluid. Neither system could plug the 2-mm slot or 2-mm holes.

A similar comparison with the 18% SVF fluid was performed with fluids containing coarse mica. The results are presented in FIG. 10.

1.34 mL of GL fibers and 2.36 mL of coarse mica were added to 300 mL of base fluid. The system failed instantly at 0.69 MPa when tested against the 2-mm slot.

1.34 mL of FM fibers and 2.36 mL of coarse mica were added to 300 mL of base fluid. This system also failed instantly at 0.69 MPa when tested against the 2-mm slot.

1.34 mL of R1+R2 fibers and 2.36 mL of coarse mica were added to 300 mL of base fluid. Unlike the others, this system performed well when tested against the 2-mm slot. The spurt was 12.5 g and the total fluid loss was 13 g after 35 min.

For the distribution of particle sizes of the fluid of Table 2, the optimal PVF is about 0.87. A fluid prepared with 0.87 PVF and 1.68 mL of stiff R1 fibers could not plug a 3 mm slot. It failed instantly at 0.689 MPa (100 psi).

However, the stiff R1 fibers performed exceptionally well in a fluid system with the same particle size distribution but a less than optimal PVF—0.84. The fluid composition is shown in Table 7. The density of this fluid was 12.5 lbm/gal, and the SVF was 25%.

TABLE 7

| R1 fluid formulation | |
|---|---|
| Ingredient | kg/m$^3$ (lbm/bbl) |
| Water | 742 (259) |
| Bentonite | 60 (21) |
| Barite | 198 (69) |
| CaCO$_3$ - 130 μm | 510 (178) |

1.68 mL of R1 fibers in 300 mL of the base fluid of Table 7 plugged a 3-mm slot

These results show that the choice of fibers can have a greater impact than the solids composition. This was clearly the case with the 2-mm slot. The GL and FM fibers failed, but the stiff fibers of the invention worked well. A fluid having a low solids content and no large (coarse) particles can plug fracture widths up to 2 mm with R1+R2 fibers, and increases in fiber concentration or modifications of fluid formulations can extend the performance window.

Example 8

Further Studies of Fiber Stiffness

Fiber stiffness is the key criterion governing the efficiency of bridging the loss zone. Stiff fibers are more efficient in bridging wider fractures. The following experiments demonstrate this effect.

Figure 11:
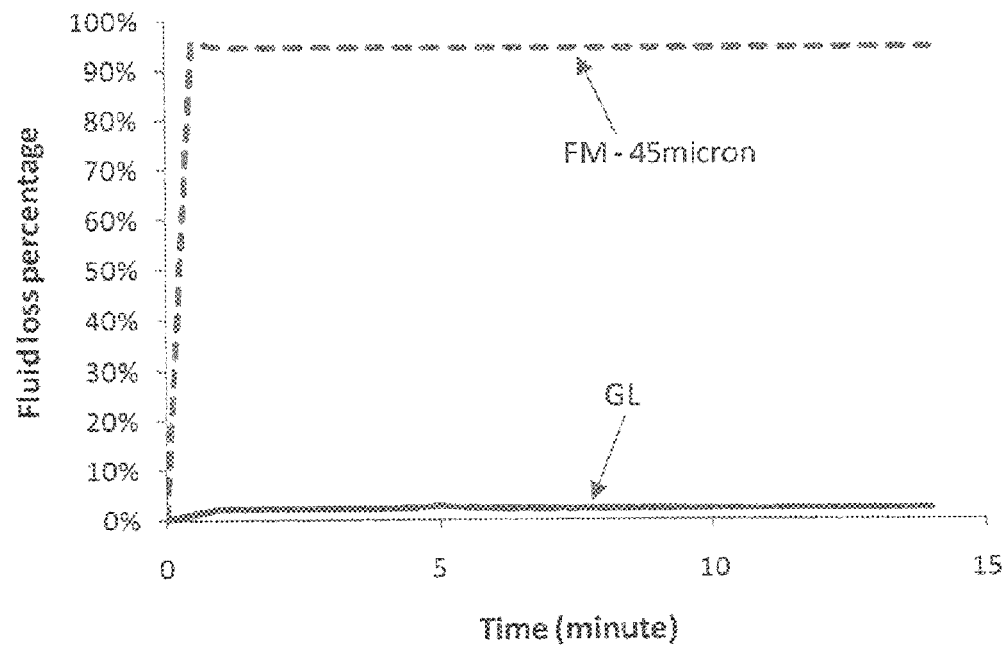
FIG. 11 shows a comparison of suitable and unsuitable fibers in a 2-mm slot.

The following comparison was made between 45-micron FM fibers and GL fibers. The apparatus of FIG. 1 was fitted with a 2-mm slot. Using the composition of Table 2, fluids were prepared with either 1.68 mL/300 mL FM or GL fibers at the same concentration. Tests were conducted at 0.69 MPa (100 psi) differential pressure. As shown in FIG. 11, the more flexible FM (polypropylene) fibers failed to provide fluid-loss control. All of the fluid was lost during the test. By contrast, the relatively stiffer GL fibers, under the same testing condition, provided fluid loss control.

Figure 12:
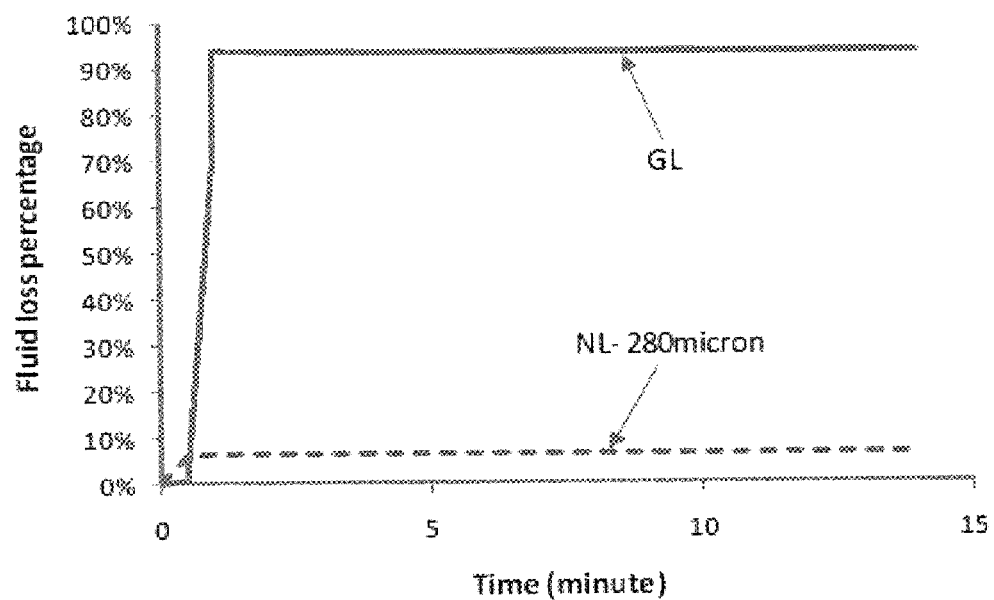
FIG. 12 shows a comparison of suitable and unsuitable fibers in a 3-mm slot.
Figure 13:
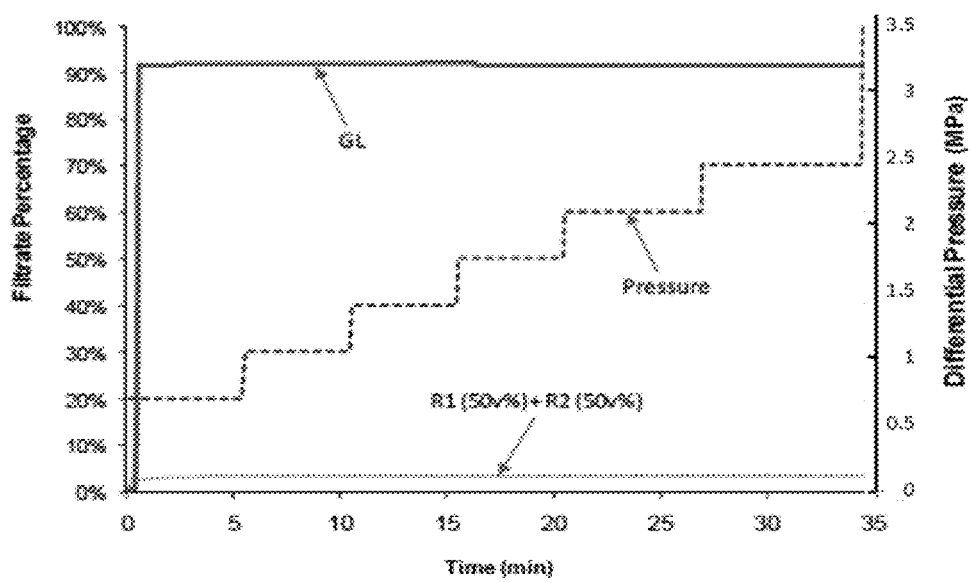
FIG. 13 shows a comparison of fibers using a combination of 1-mm, 2-mm and 3-mm slots.

The next experiment employed the 3-mm slot. 1.84 mL of GL fibers were added to 400 mL of the fluid of Table 3. As shown in FIG. 12, the glass fibers were not stiff enough to provide fluid loss control at 3.45 MPa (500 psi). On the other hand, stiffer nylon fibers (280-micron TYNEX™ with a length of 16 mm), tested under the same conditions and with the same fiber volume, provided excellent fluid-loss control and plugged the 3-mm slot readily after losing less than 10 percent of the test fluid. This nylon fiber is more than 1,000 times stiffer than the glass fibers.

Using stiff fibers not only allows superior fluid-loss control for larger fracture widths, but also improves the efficiency of controlling fluid loss over a wider range of fracture widths. This effect was illustrated during the following experiments. The apparatus of FIG. 2 was fitted with a grid having 1-mm, 2-mm and 3-mm slots. For each experiment, 2.68 mL of fibers were added to 400 mL of the fluid of Table 3. Pressure was applied in 0.69-MPa (100-psi) increments up to 3.45 MPa (500 psi).

As shown in FIG. 12, the GL fibers lacked sufficient stiffness and failed to plug the grid. However, the R1+R2 blend was successful. The R1 and R2 fibers are approximately 1000 times and 240 times stiffer than the GL fibers, respectively. This feature minimizes the risk of not knowing the downhole-fracture widths and their distribution.

The same efficiency improvement obtained by using stiff fibers was also observed when oil-base fluids were employed. The base fluid was a 1.44 kg/L (12 lbm/gal) 80/20 OBM with the following composition.

Figure 14:
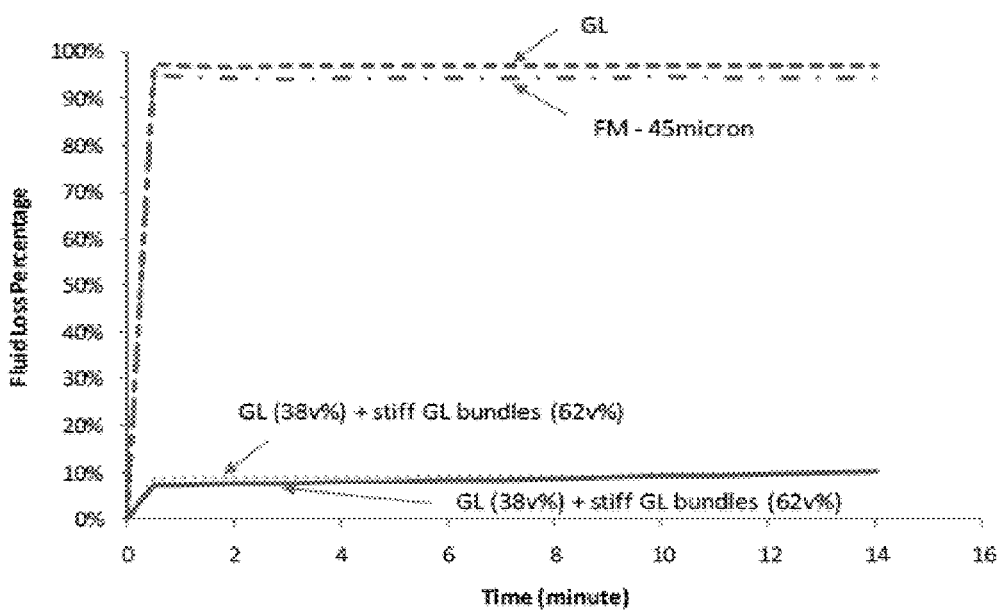
FIG. 14 shows a comparison of fibers in an oil-based mud.

492 kg/m$^3$ EXXSOL™ D100 hydrocarbon fluid from ExxonMobil, Irving, Tex., USA 13 kg/m$^3$ VERSAMUL™ multipurpose emulsifier from M-I SWACO, Houston, Tex., USA 13 kg/m$^3$ VERSACOAT™ organic surfactant from M-I SWACO 9 kg/m$^3$ VG SUPREME™ organophilic hectorite from Baroid Industrial Products, Houston, Tex., USA 14 kg/m$^3$ ECOTROL™ filtration control additive from M-I SWACO 23 kg/m$^3$ Ca(OH)$_2$ 45 kg/m$^3$ CaCl$_2$ 667 kg/m$^3$ barite This OBM also contained 280 lbm/bbl (797 kg/m$^3$) of CaCO$_3$ particles. The size distribution of the CaCO$_3$ particles was 74:13:13 of particles having $d_{50}$s of 500 microns: 50 microns: 10 microns, respectively. The fiber volumes were kept constant at 4 mL in 350.5 mL of the final fluid. As shown in FIG. 14, both the FM and GL fibers failed to control the fluid loss. The addition of stiffer fibers resulted in significantly improved plugging efficiency. In this case, the stiff fiber was a bundle of undispersed glass fibers (for example, CEMFIL™ 62/3 from OCV). There are approximately two to three hundred glass fibers in each bundle; therefore, the bundle behaves like a stiff fiber.

Figure 15:
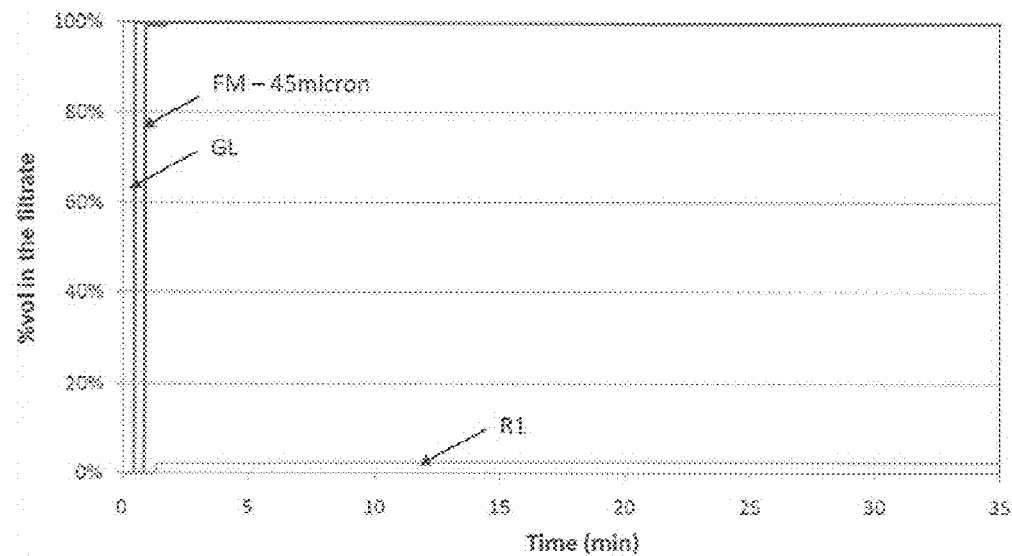
FIG. 15 shows a comparison of fibers with direct application of high pressure.

An important feature of stiff fibers is that they still exhibit the ability to control fluid loss when the differential pressure is immediately high (as opposed to increasing the pressure gradually). In FIG. 15, a comparison is shown for three different fibers: the flexible polypropylene fiber FM (having a diameter of about 45 microns), the brittle glass fiber GL (having a diameter of about 20 micron) and the stiff R1 fiber. The fluid was the fluid of Table 4 and the fiber concentrations were 1.68 mL in 300 mL. The slot width was 2 mm. All three formulations provided good fluid loss control at 0.69 MPa (100 psi) of differential pressure. However, at 3.45 MPa (500 psi) pressure, the FM fiber system exited the slot as soon as the pressure was applied. The same result was observed for the GL system; in addition, the glass fibers were ruptured into smaller fragments during the experiment. For the stiff R1 fiber, the ability to control fluid loss was retained.

Figure 16:
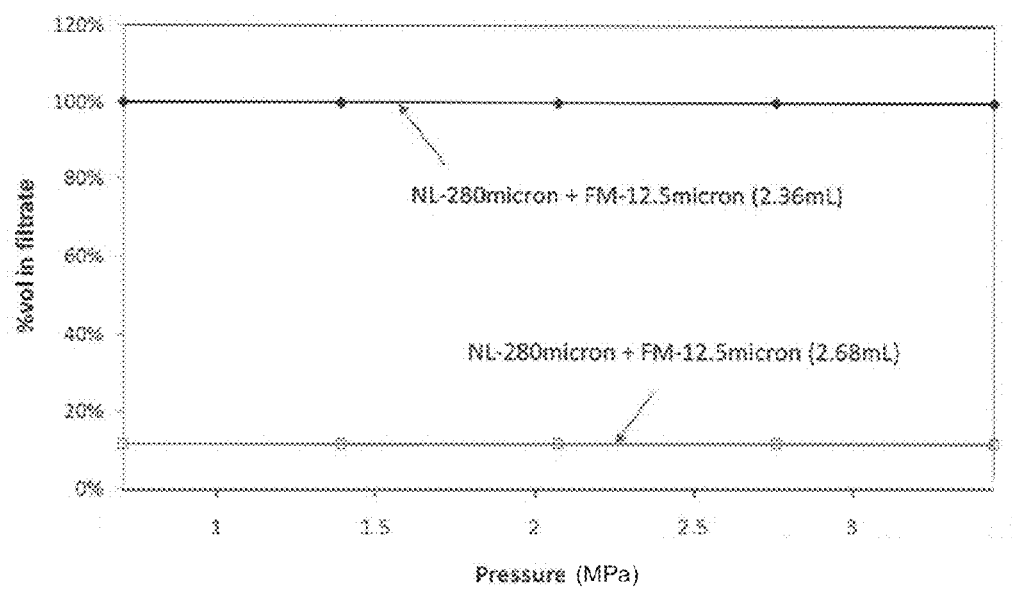
FIG. 16 shows fiber efficiency as a function of fiber concentration.

For a given type of fiber or fiber blend, increasing the fiber concentration improves the efficiency of fluid-loss control. The apparatus of FIG. 2 was fitted with the 3-mm slot, and the fluid of Table 5 was used. The fiber was a blend of stiff, 280-micron nylon fiber (NL) and flexible 12.5-micron polypropylene (FM) fiber. The weight ratio was 90% NL and 10% FM. As shown in FIG. 16, fluid-loss-control efficiency was improved when the total fiber concentration was raised from 2.35 mL (in 300 mL of final fluid) to 2.68 mL.

In addition to increasing the fiber concentration to achieve better fluid loss control, the solid volume fraction (SVF) of the fluid may also be increased, i.e. adding more sized solids to improve the fluid-loss-control efficiency.

Figure 17:
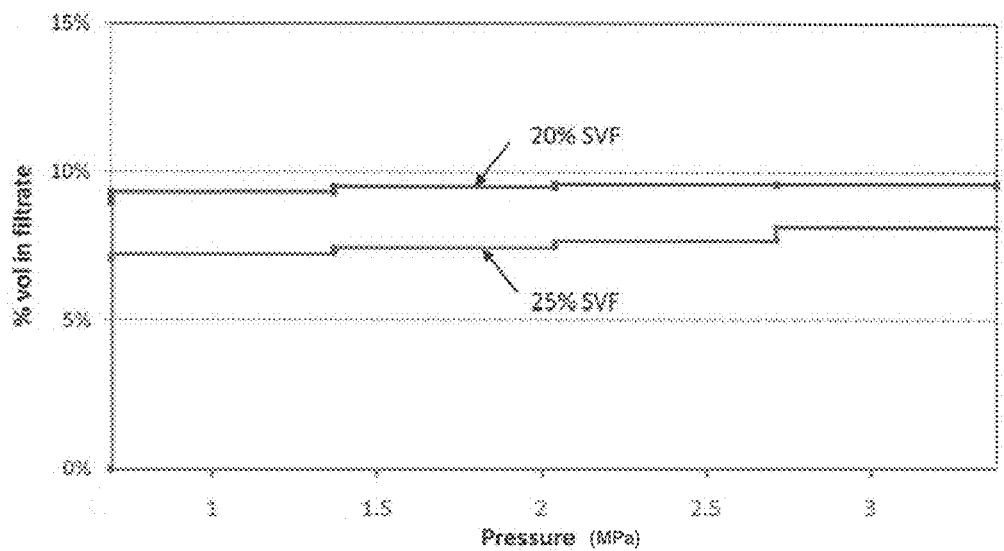
FIG. 17 shows fiber performance with varying solids volume fractions.

In FIG. 17, a comparison is made between two systems having blends of stiff and flexible fibers (90 weight percent stiff nylon fibers and 10 weight percent flexible propylene FM fibers), one with 20 percent SVF and the other with 25 percent SVF. The higher SVF fluid consistently exhibited better efficiency between 0.69 MPa (100 psi) and 3.45 MPa (500 psi) of differential pressure. The tests were conducted with a 3-mm slot, and the overall fiber concentration was 2.89 mL in 300 mL of final fluid. The base fluid in each case was the fluid shown in Table 5.

Figure 18:
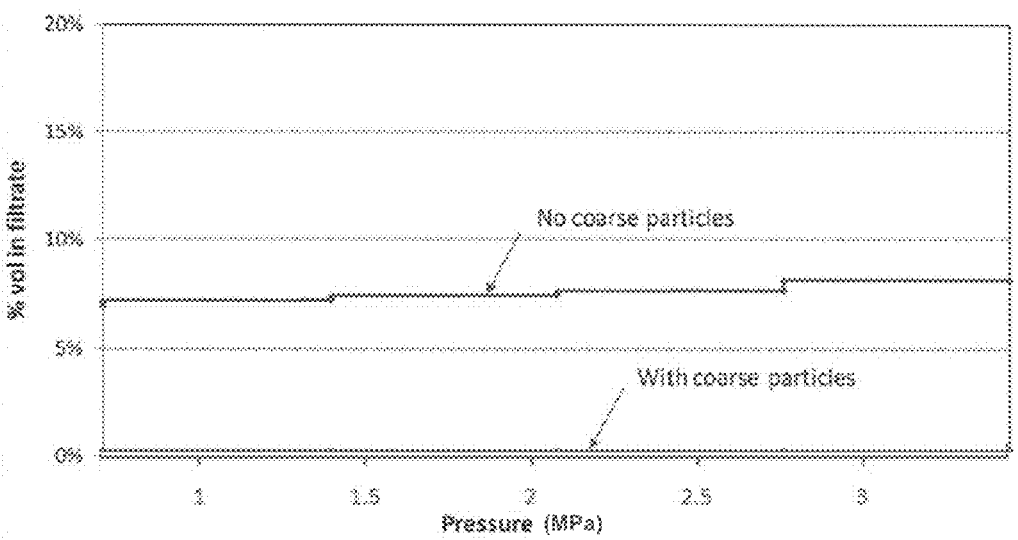
FIG. 18 shows results of including coarse particles at constant solids volume fraction.

Alternatively, increasing the particle size of the added solids can also improve the overall efficiency of fluid loss control. Note that, to obtain increased efficiency, it would be necessary to ensure that the overall particle-size distribution of the added particles was still in the suitable working range. The fluid of Table 5 was altered such that 25% of the 130-micron CaCO$_3$ was replaced by 1000-micron CaCO$_3$. As shown in FIG. 18, adding the larger particles improved fluid-loss control.

Figure 19:
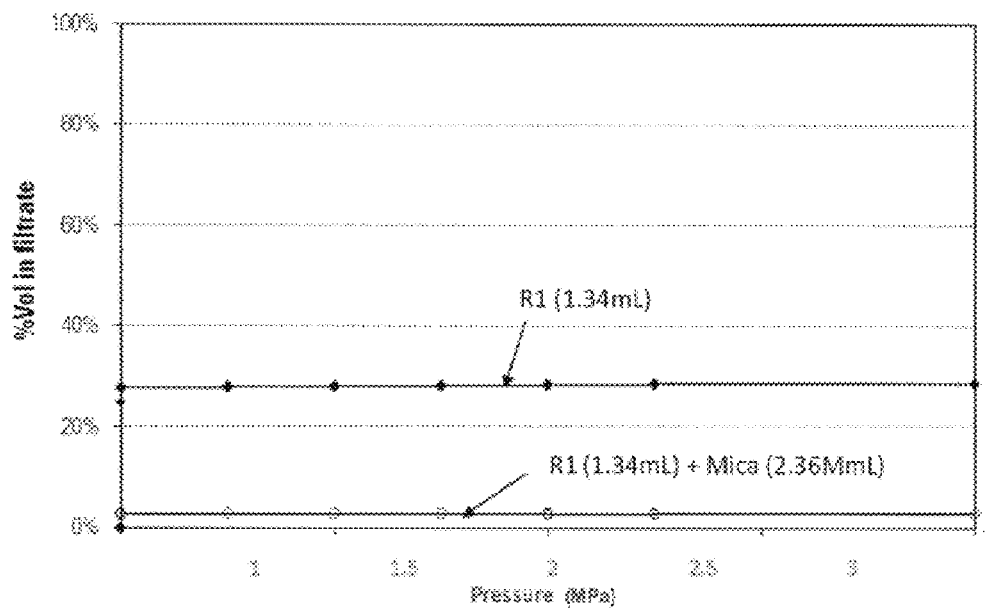
FIG. 19 shows the effect of addition of mica flakes on the efficiency of stiff fibers.

Alternatively, plate-like material may also be used to improve fluid-loss control. Using 300 mL of the base fluid of Table 2, 2.36 mL of mica flakes were added with 1.34 mL of R1 fibers. The apparatus of FIG. 2 was fitted with a 2-mm slot. As shown in FIG. 19, the fluid-loss control was better than a fluid with fibers alone. The same synergistic effect has also been observed with flexible fibers and with a blend of stiff and flexible fibers.

Example 9

Plugging Comparison Based on Fiber Structural Parameters and Lost Circulation Material Particle Size Distribution For a given fiber or fiber blend, the particle-size distribution (PSD) of the added particles governs the permeability of the plugged bridging fiber network. The selection of the proper PSD is based on the pore-size distribution of the fiber network, and therefore depends on structural parameters of the fibers. The use of stiff fibers facilitates bridging of the open fractures; however, if the PSD of the added solids is not engineered properly, the bridged-fiber network will be too porous and fluid-loss control will suffer.

Figure 20:
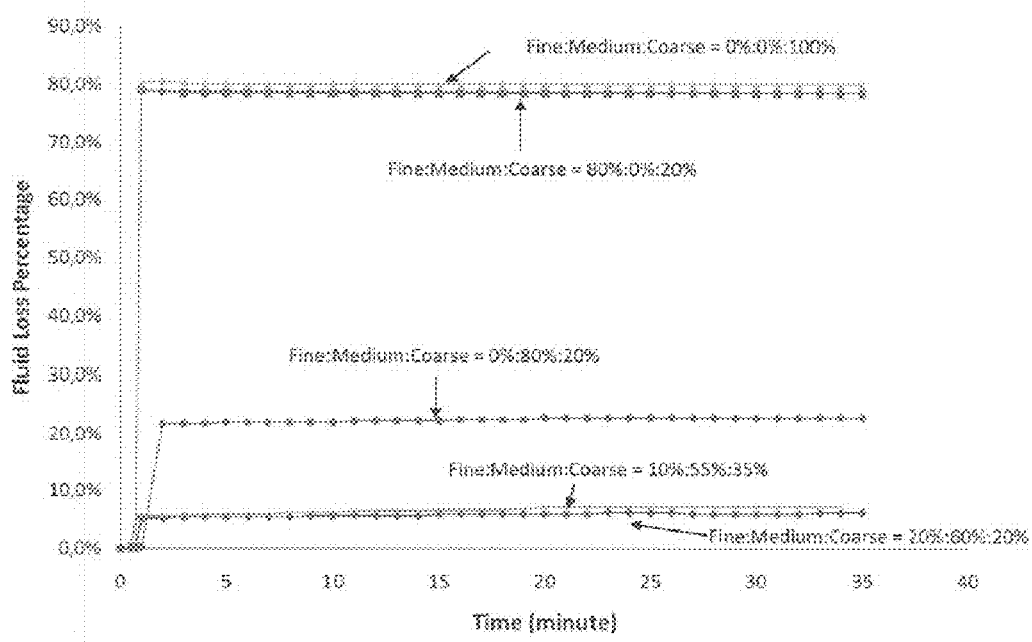
FIG. 20 shows fluid loss control as a function of varying the particle-size distribution of the added particles in a water-based fluid.

For example, the following five tests were performed under identical test conditions. The apparatus of FIG. 2 was fitted with a 3-mm slot, and the test pressure was 0.69 MPa (100 psi). For all tests, 1.68 mL of the R1+R2 fiber system were added to 400 mL of the base fluid described in Table 5. The only variable was the PSD of the added solids. The PSD is denoted by the ratio of Fine:Medium:Coarse. The $d_{50}$ of the fine particles was 10 microns; the $d_{50}$ of the medium particles was 180 microns; and the $d_{50}$ of the coarse particles was 830 microns. The results are shown in FIG. 20.

Properly engineered ratios of the three categories of particles typically provided improved efficiency. The 20:60:20 and 10:55:35 blends provided excellent fluid-loss control. In case more fluid loss is required, for example to build a thicker filter cake, then the PSD can be tuned to increase the fluid loss. This is exemplified by the performance of the 0:80:20 blend (FIG. 20).

The same trend of optimizing fluid loss control via the PSD was also observed for an oil-base fluid. Just as in water-based fluids, to achieve optimal fluid-loss control, it is necessary to engineer and optimize the PSD of the added particles. For these tests, the apparatus of FIG. 2 was fitted with the 3-mm slot. The base fluid has the following composition.

Figure 21:
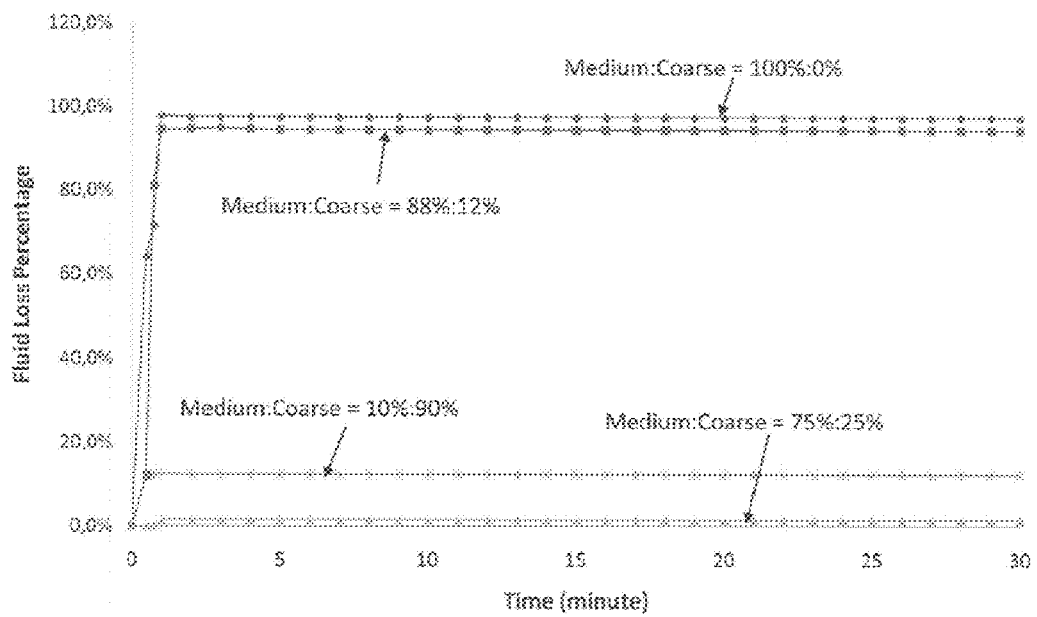
FIG. 21 shows fluid loss control as a function of varying the particle-size distribution of the added particles in an oil-based fluid.

492 kg/m³ EXXSOL™ D100 hydrocarbon fluid from ExxonMobil, Irving, Tex., USA
13 kg/m³ VERSAMUL™ multipurpose emulsifier from M-I SWACO, Houston, Tex., USA
13 kg/m³ VERSACOAT™ organic surfactant from M-I SWACO
9 kg/m³ VG SUPREME™ organophilic hectorite from Baroid Industrial Products, Houston, Tex., USA
14 kg/m³ ECOTROL™ filtration control additive from M-I SWACO
23 kg/m³ Ca(OH)$_2$
45 kg/m³ CaCl$_2$
812 kg/m³ barite The fiber blend was 63 weight percent of stiff 280-micron NL fiber (TYNEX™) and 37 weight percent of flexible 50-micron NL fiber (PA66™ from Rhodia). The results are presented in FIG. 21.

The SVF was 25%; however, there were no fine particles. In an emulsion, the encapsulated droplets fulfill their function.

Even if the PSD of the particles is properly engineered, then an adequate concentration of particles in the fluid is still needed to achieve fluid-loss control. A comparison was made between three fiber systems. The base fluid of Table 2 was used, and 1.34 mL glass (GL), polypropylene (FM), of stiff R1 fiber were added 300 mL of base fluid. These tests were performed with the base fluid in Table 2, at 0.69 MPa (100 psi) in a 2 mm slot.

Figure 22:
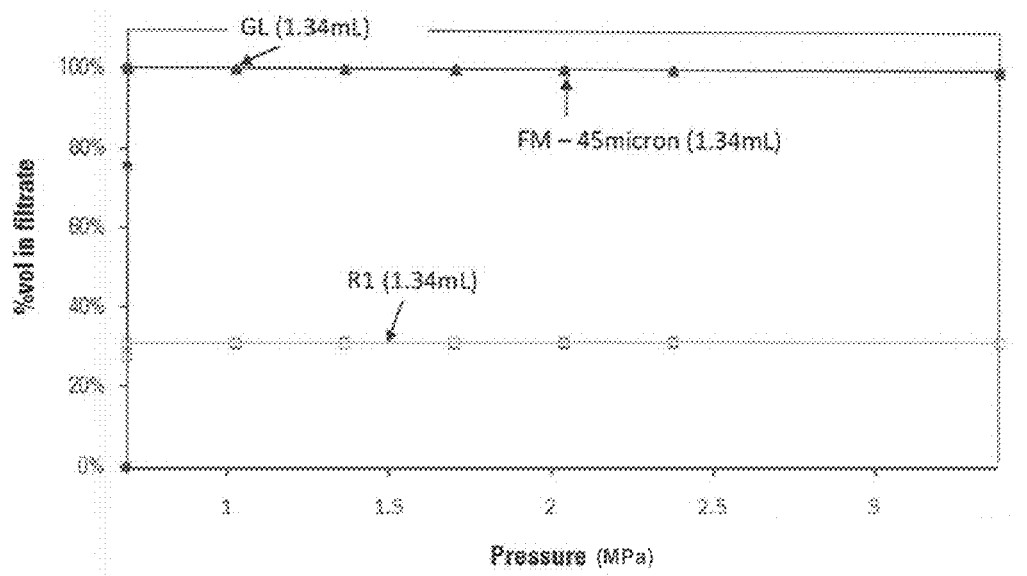
FIG. 22 shows the efficiency retained by stiff fibers at low solids volume fraction.

The PSD was 20 percent Fine/60 percent Medium/20 percent Coarse for the GL fiber and FM-45 micron fiber, and 10 percent Fine/90 percent Medium for the test with R1 fiber only. As shown in FIG. 22, the stiff R1 fibers provided good fluid loss control, and the more flexible polypropylene and glass fibers failed. Reducing the criticality of the solids content is another beneficial feature of using stiff fibers.

As previously mentioned, the optimal PSD range depends on the structure of the fibers and, to some degree, on the nature of the raw materials. For example, the thinner and more flexible fibers, like glass fibers and polypropylene fibers, tend to favor a combination of fine, medium and coarse particles, with the content of medium particles being the highest (see Table 8). For the thicker and stiffer fibers like nylon and R1 fibers, it is not necessary to have the coarse particles. In other words, when thinner and more flexible fibers are used, addition of coarser particles is required to control the fluid loss.

TABLE 8

Optimal PSD range comparison

| Fiber | Fine | Medium | Coarse |
|---|---|---|---|
| Glass fiber | 10-20 vol % | 60-80 vol % | 10-20 vol % |
| Stiff Nylon fiber (280 microns in diameter) | 10-20 vol % | 40-90 vol % | 0% |
| Flexible Polypropylene fiber (13 microns in diameter) | 10-20 vol % | 60-80 vol % | 10-20 vol % |
| R1 fiber | 10-20 vol % | 40-90 vol % | 0% |

Figure 23:
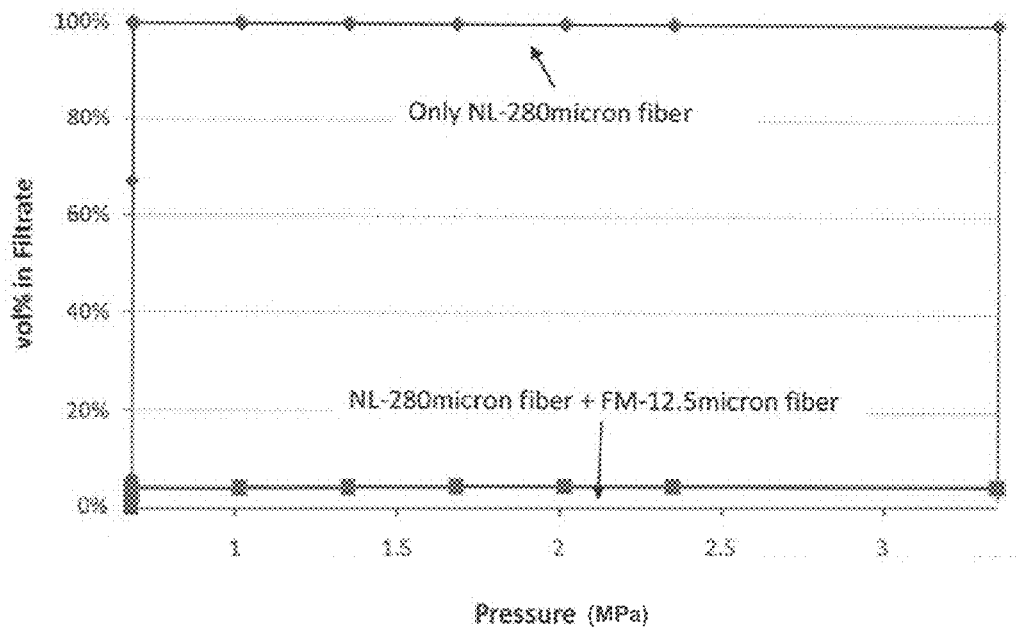
FIG. 23 shows the synergy between flexible and stiff fibers.

It was also found that substituting flexible fibers for some of the stiff fibers may also further improve the efficiency. For example, as shown in FIG. 23, comparing two systems with identical fiber volumes, when some of the stiff nylon fibers were replaced by flexible polypropylene fibers, the efficiency was greatly improved with a 3-mm slot. These tests were carried out with 1.68 mL of total fiber volume in 300 mL of the base fluid of Table 5, which had a SVF of 25 percent. For the fiber blend, the weight ratio of the stiff 280-micron nylon to the flexible 12.5 micron FM was 90 to 10. This synergy was observed with a wide range of fiber blends, ranging from 10 volume percent flexible/90 volume percent stiff, to 90 volume percent flexible/10 volume percent stiff. It has been observed that, for these fibers and this PSD, the most robust ratio is 70 volume percent stiff fibers and 30 volume percent flexible fibers.

Example 10

Stability of the Fiber Plugs Under Downhole Conditions

Figure 24:
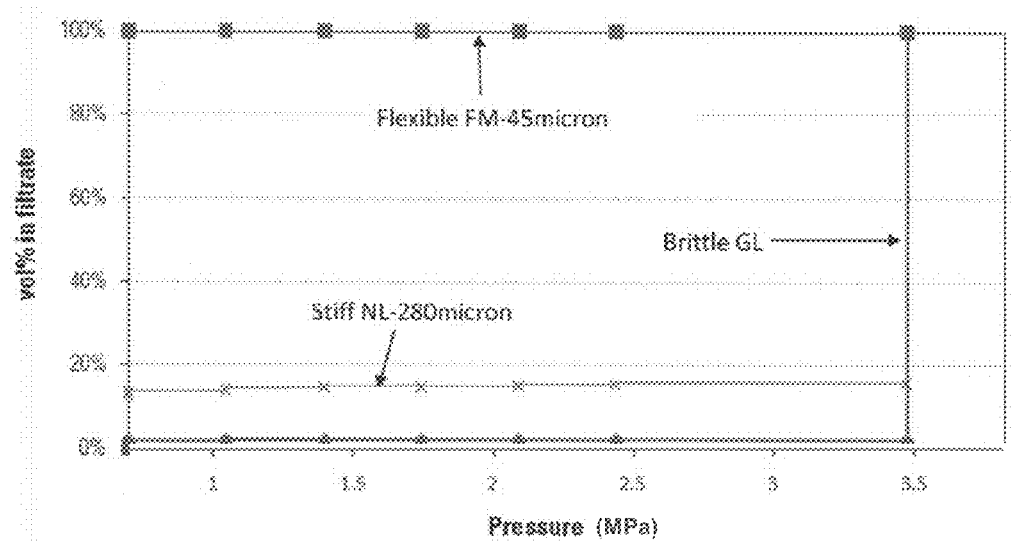
FIG. 24 shows the high-pressure performance of stiff fibers compared to brittle or flexible fibers.

Increasing the differential pressure across the loss zone can render a fiber plug ineffective. Tests were conducted with the fluid shown in Table 5, with a fiber concentration of 1.68 mL in 300 mL of the base fluid. The apparatus shown in FIG. 2 was fitted with the 2-mm slot. Results are presented in FIG. 24.

Flexible polypropylene fibers, FM, were shown to be ineffective even under the relatively low pressure of 0.69 MPa (100 psi). Brittle glass fibers, GL, are stiffer than polypropylene; therefore, they provided fluid-loss control for the 2-mm slot, but they failed when the differential pressure was raised to 3.45 MPa (500 psi). On the other hand, the stiff 280-micron nylon fibers retained their efficiency over this pressure range throughout the tests. This means that stiff fiber plugs will be much more stable under downhole conditions, for example, if surging and/or swabbing were encountered, or simply if the effective circulation density (ECD) during drilling was increased.

Figure 25:
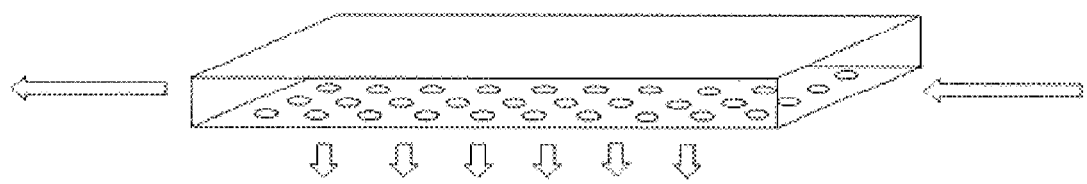
FIG. 25 is a diagram of a fluid-loss grid connected to an experimental flow loop.

Another series of tests was conducted with a flow loop featuring with a grid containing thirty 3-mm holes (FIG. 25). The fluids with fibers and solids were pumped across the grid, and the filtrate exited the flow loop perpendicular to the main flow direction. The initial flow rate through the loop was 378 L/min (100 gal/min). In experiments during which the grid was plugged, pumping was stopped and then resumed at 756 L/min (200 gal/min) to determine the plug resistance to the wall shear stress imposed by the fluid flow. The wall stress is estimated to be 35 Pa at the higher flow rate. The total fiber concentration for these tests was fixed at 1.68 mL per 300 mL of the base fluid of Table 5.

Under the dynamic flow conditions, the GL fibers were able to plug the 3-mm holes of the grid at a pump rate of 378 L/min. However, when pumping was resumed at 756 L/min, the plugs quickly eroded away. For a blend of stiff 280-micron nylon fibers (TYNEX™) and 12.5-micron flexible FM fibers (SPECTER™), the 3-mm holes were also plugged readily at 378 L/min. However, when pumping was resumed at 756 L/min, there was no sign of erosion, the plug was stable, and no fluid loss was observed. The presence of stiff fiber strengthened the plugs, and therefore increased the overall resistance against erosion (as shown in Table 9).

TABLE 9

Comparison of plug stability under dynamic flow conditions.

| Fiber [mL] | Flow Rate [GPM] | Grid with 2 mm holes | Wall shear stress, Pa | Behavior |
|---|---|---|---|---|
| Glass [1.68] | 200 | Plugged | 35 | Plug dislodged immediately from the grid |
| Blend of Stiff and Flexible [1.68 mL] | 200 | Plugged | 35 | Plugs were stable and could not be dislodged |

Example 11

Resistance to Wall Shear Stress

Figure 26:
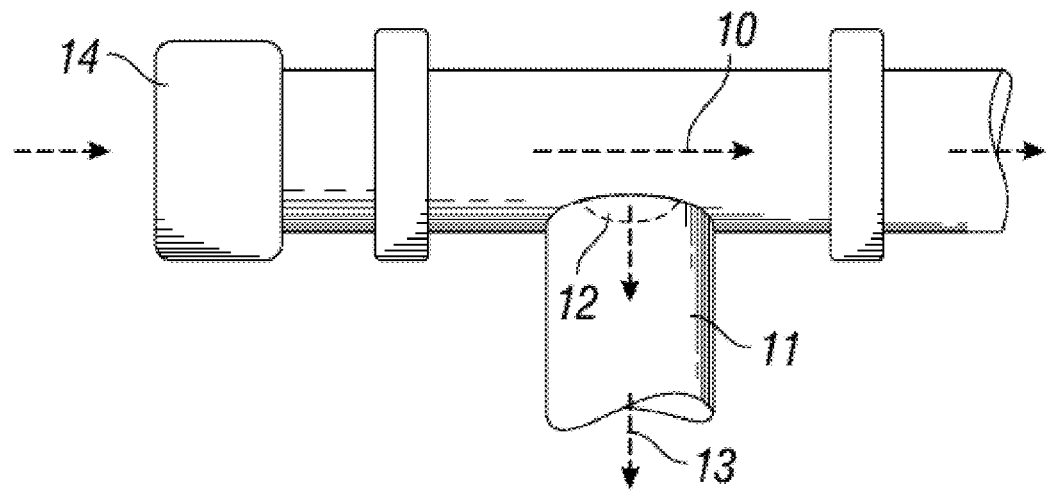
FIG. 26 is a diagram of a laboratory apparatus for simulating tangential wall stress arising from fluid flow.

Four experiments were performed to evaluate the ability of fibrous filter cakes to resist erosion arising from tangential shear stress. The first two experiments involved the laboratory apparatus shown in FIG. 26. The equipment features a 3-cm (1.2-in.) diameter pipe 10, with another 3-cm diameter pipe 11 fitted perpendicularly. A filter cake 12 is fitted at the junction between the two pipes. Filtrate 13 is collected at the other end of pipe 11. The apparatus also has a flowmeter 14. Water is pumped through pipe 10 subjecting the filter cake to tangential stress. The filter-cake performance is monitored by observing the volume of filtrate collected from pipe 11.

The first experiment involved glass fibers and a water-base mud whose composition is given in Table 10. 20 vol % of coarse $CaCO_3$ particles were present, because glass-fiber filter cakes need coarse particles to survive sudden pressure changes.

A filtercake containing 1.68 mL of glass fibers was transferred to the apparatus. Water was pumped through the apparatus at 30 L/min, corresponding to a shear stress of 1.53 Pa. Generally, the shear stresses experienced in the annulus may be between 15-25 Pa during cementing and 25-30 Pa during drilling.

TABLE 10

Composition of Water-Base Mud 1

| WBM-1 | |
|---|---|
| Water (lbm/bbl) [kg/m$^3$] | (262) [749] |
| Bentonite (lbs/bbl) [kg/m$^3$] | (21) [60] |
| LCM 1: $CaCO_3$ of 10 μm (lbm/bbl) [kg/m$^3$] | (44) [126] |
| LCM 2: $CaCO_3$ of 130 μm (lbm/bbl) [kg/m$^3$] | (172) [493] |
| Density (lbm/gal) [SG] | (11.8) [1.41] |
| Solid Loading | 25% |

The second experiment involved a water-base mud whose composition is given in Table 11. The fluid also contained 2.00 mL of a blend of stiff (aspect ratio 10 to 100) and flexible (aspect ratio 200 to 1000) fibers. The stiff fiber was NL, and the flexible one was FM (SPECTER).

A 2.00-mL fiber-blend filter cake was deposited across a 3-mm opening. The fiber blend plugged the opening and sustained overburden-pressure changes from 7 to 42 MPa (100 to 600 psi). The fiber-blend filtercake was then transferred to the apparatus. Water was pumped through the apparatus at 30 L/min, corresponding to a shear stress of 1.53 Pa.

TABLE 11

Composition of Water-Base Mud 2

| WBM-2 | |
|---|---|
| Bentonite (lbm/bbl) [kg/m$^3$] | (21) [60] |
| Barite (lbm/bbl) [kg/m$^3$] | (69) [198] |
| LCM 1: $CaCO_3$ of 1000 μm (lbm/bbl) [kg/m$^3$] | (45) [129] |
| LCM 2: $CaCO_3$ of 130 μm (lbm/bbl) [kg/m$^3$] | (133) [381] |
| Density (lbm/gal) [SG] | (12.5) [1.50] |
| Solid Loading | 25.7% |

Figure 27:
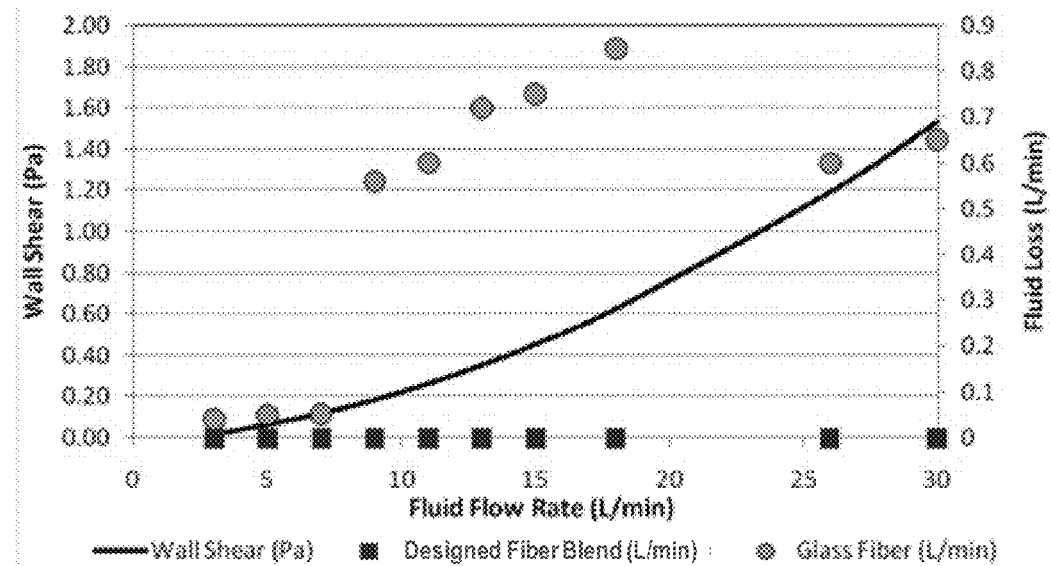
FIG. 27 presents the results of experiments evaluating the erosion resistance of filter cakes exposed to tangential wall stress.

The results of both experiments are shown in FIG. 27. The glass fibers could not sustain the tangential erosion, and began to fail at a flow rate of 3.0 L/min. However, the filter cake containing the blend of stiff and flexible fibers did not leak at the maximum flow rate of 30 L/min.

The flexible fibers have an intrinsic tendency to pass through the fracture; however, the stiff fibers anchor them in place. Nevertheless, some of the flexible fibers manage to pass through the fracture, dragging a few stiff fibers with them. This promotes the formation of a strong filter cake with internal plugging.

Figure 28:
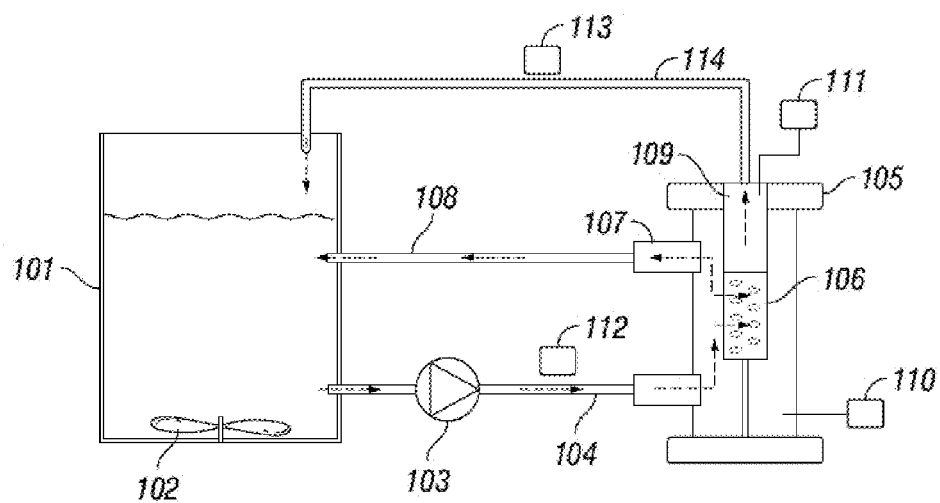
FIG. 28 is a schematic diagram of an experimental flow loop that was used in several examples.

The third and fourth experiments involved the same two systems described above; however, a pilot-scale apparatus was employed that is capable of simulating the downhole shear environment—35 MPa. A schematic diagram is shown in FIG. 28. The apparatus comprises a 1600-L (10 bbl) mixing tank 101 fitted with a stirrer 102. A centrifugal pump 103 transports fluid from the mixing tank through a 102-mm (4-in.) hose 104 into a loss-zone unit 105. The loss-zone unit is made of transparent polycarbonate, allowing one to observe the behavior of the fluid. Inside the loss-zone unit, the fluid passes by a grid 106 comprising holes (see FIG. 25). Grids with various hole sizes are available. The outlet 107 of the loss-zone unit is connected to a 102-mm (4-in.) hose 108 that leads back into the mixing tank. The arrangement allows continuous fluid circulation during a test. Fluid that escapes through the grid is collected through a filtrate outlet 109. The inlet and filtrate outlet of the loss-zone unit are fitted with pressure sensors 110 and 111, as well as Rosemount flowmeters 112 and 113. Fluid exiting the filtrate outlet travels through a 25-mm (1-in.) hose 114 back into the mixing tank.

For each experiment, 1600 L (10 bbl) of fluid were prepared. As described in Table 12, the glass-fiber filter cake was easily removed at 35 MPa shear, while the flexible-fiber blend filter cake survived.

TABLE 12

Fiber Filter Cake Performance Under Realistic Shear-Stress Conditions

| Fiber [mL] | Flow Rate [L/min (gal/min)] | Grid with 2-mm holes | Wall shear stress, Pa | Behavior |
|---|---|---|---|---|
| Glass [1.68] | 760 (200) | Plugged | 35 | Plug dislodged immediately from the grid |
| Blend of Stiff and Flexible [1.68] | 760 (200) | Plugged | 35 | Plugs were stable and could not be dislodged |

Example 12

Controlling Spurt by Adjusting Ratio Between Stiff and Flexible Fibers

Figure 29:
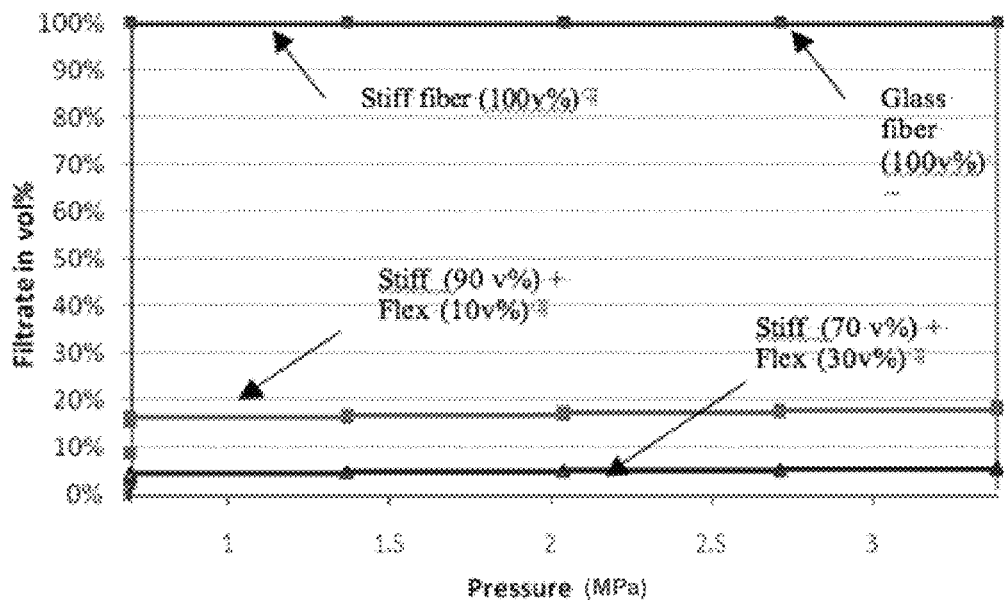
FIG. 29 presents the effect of the ratio between stiff and flexible fibers on spurt.

Four fluids with the composition described in Table 10 were prepared. Each fluid contained a different fiber design: 100 vol % stiff (NL), 100 vol % glass (GL), 90 vol % stiff; 10 vol % flexible (FM Specter), and 70 vol % stiff; 30 vol % flexible. The fiber concentration during each test was 1.68 mL/300 mL. Each fluid was placed into the apparatus described in FIG. 1, which was fitted with a 3-mm slot. The pressure was increased from 0.69 MPa (100 psi) to 2.45 MPa (500 psi) in 0.69 MPa increments. The results are shown in FIG. 29.

The 100 vol % glass fiber fluid and the 100 vol % stiff fiber fluid failed to deposit a barrier to flow. However, the fluids containing stiff and flexible fibers provided robust control. Lower spurt was observed with the fluid that contained 30 vol % flexible fibers.

Example 13

Filter-Cake Strength Determination

The effects of fiber compositions on the filter-cake strength were studied. Three fluids with the composition described in Table 10 were prepared. The first fluid contained 14.3 kg/m³ (5.0 lbm/bbl) of glass fiber (GL). The second fluid contained 6.0 kg/m³ (2.1 lbm/bbl) of a mixture of stiff and flexible fibers (70 vol % stiff (NL): 30 vol % flexible (FM Specter). The third fluid contained 6.0 kg/m³ (2.1 lbm/bbl) of a mixture of stiff and flexible fibers (90 vol % stiff: 10 vol % flexible). Each fluid was placed into the apparatus described in FIG. 1, which was fitted with a 1-mm slot.

Filter cakes were prepared at 3.45 MPa (500 psi) pressure, and then transferred to a TA-HD Plus Texture Analyzer to determine the filter-cake strength. The Texture Analyzer is manufactured by Texture Technologies, Scarsdale, N.Y., USA. A filter cake is placed on a grid, and the apparatus forces a blade through the filter cake. A load cell measures the force necessary to penetrate the filter cake.

Figure 30:
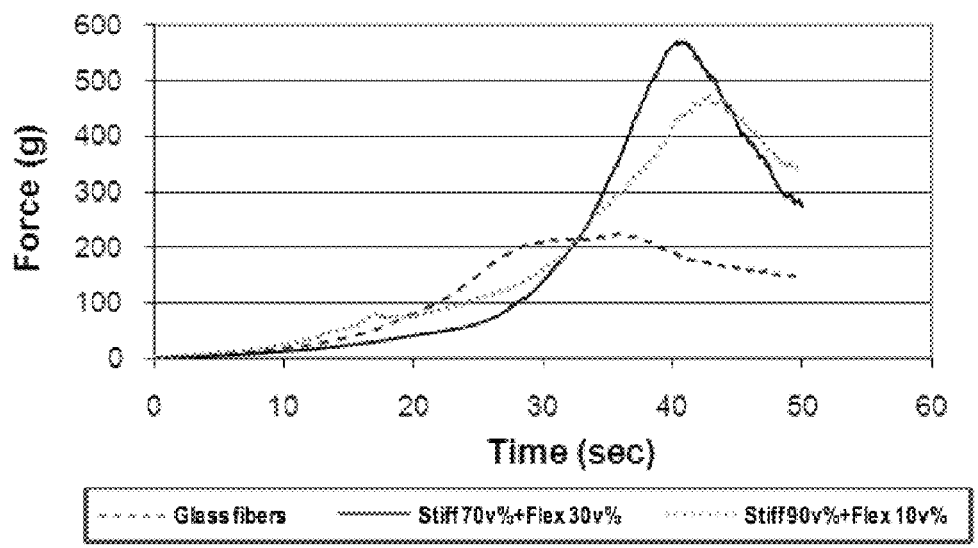
FIG. 30 presents the effect of fiber compositions on filter-cake strength.

The results are presented in FIG. 30. The 70:30 stiff:flexible filter cake was the strongest, followed by the 90:10 stiff:flexible filter cake and the glass filter cake.

The invention claimed is:

1. A method for blocking fluid flow through a pathway in a subterranean formation penetrated by a wellbore, comprising:
   (i) selecting compositions, concentrations and dimensions of stiff fibers and solid plugging particles;
   (ii) preparing a blocking fluid comprising the stiff fibers and a blend of the solid plugging particles; and
   (iii) forcing the blocking fluid into the pathway,
   wherein the stiff fibers have a value of the parameter $$S = \frac{Ed^4}{Wl^3},$$

where S is the stiffness, E is Young's modulus, d is the diameter, W is the force causing a deflection, and l is the length; and
   the value of S is about 2 to about 400,000 times that of a fiber having a modulus of 65 GPa, a diameter of 20 microns, and a length of 12 mm.

2. The method of claim 1, wherein the stiff fibers form a mesh across the pathway, and the solid particles plug the mesh, thereby blocking fluid flow.

3. The method of claim 1, wherein the stiff fibers have a Young's modulus of from about 0.5 to about 100 GPa.

4. The method of claim 1, wherein the stiff fibers have a shortest cross-sectional distance of from about 80 to about 450 microns.

5. The method of claim 1, wherein the length of the stiff fibers is between about 5 to about 24 mm.

6. The method of claim 1, wherein the stiff-fiber concentration is from about 2.85 kg/m³ to about 42.8 kg/m³.

7. The method of claim 1, wherein the fluid further comprises fibers that are selected from non-stiff fibers, differing stiff fibers, or both.

8. The method of claim 7, wherein the total fiber concentration is from about 2.85 to about 42.8 kg/m³.

9. The method of claim 7, wherein the non-stiff fibers have a Young's modulus of from about 0.5 to about 10 GPa.

10. The method of claim 7, wherein the non-stiff fibers have a shortest cross-sectional distance of from about 10 to about 100 microns.

11. The method of claim 1, wherein the concentration or composition of the stiff fibers is varied.

12. The method of claim 1, wherein the blocking fluid further comprises mica.

13. The method of claim 1, wherein the solid volume fraction (SVF) of the solid plugging particles is between 8 and 50 volume percent.

14. The method of claim 1, wherein the solid plugging particles are present as fine, medium and coarse particles, wherein the average particle size of the fine particles is smaller than 30 microns, the average particle size of the medium particles is between 30 microns and 180 microns, and the average particle size of the coarse particles is between 180 micron and 1000 microns.

15. The method of claim 1, wherein the solid plugging particles comprise calcium-carbonate particles.

16. The method of claim 1, wherein the pathway has one dimension across it of at least about 1 mm.

17. The method of claim 1, wherein the pathway is a hydraulic fracture, and fluid flow into the fracture is blocked.

18. A method for treating lost circulation in a well in a subterranean formation penetrated by a wellbore, having one or more pathways in the formation through which fluids escape the wellbore and enter the formation, comprising:
   (i) selecting compositions, concentrations and dimensions of solid plugging particles and fibers, the fibers being stiff fibers, or a mixture of stiff and non-stiff fibers;
   (ii) preparing a blocking fluid comprising the fibers and a blend of the solid plugging particles; and
   (iii) pumping the blocking fluid into the well continuously until fluid flow into the formation is satisfactorily reduced,
   wherein the stiff fibers have a value of the parameter $$S = \frac{Ed^4}{Wl^3},$$

where S is the stiffness, E is Young's modulus, d is the diameter, W is the force causing a deflection, and l is the length; and
   the value of S is about 2 to about 400,000 times that of a fiber having a modulus of 65 GPa, a diameter of 20 microns, and a length of 12 mm.

19. A method for treating lost circulation in a well in a subterranean formation penetrated by a wellbore, having one or more pathways in the formation through which fluids escape the wellbore and enter the formation, comprising:
  (i) selecting compositions, concentrations and dimensions of solid plugging particles and fibers, the fibers being stiff fibers, or a mixture of stiff and non-stiff fibers;
  (ii) preparing a blocking fluid comprising the fibers and a blend of the solid plugging particles; and
  (iii) placing a discrete, desired quantity of blocking fluid adjacent to and/or into a well interval where one or more pathways exist, wherein the stiff fibers have a value of the parameter $$S = \frac{Ed^4}{Wl^3},$$

where S is the stiffness, E is Young's modulus, d is the diameter, W is the force causing a deflection, and l is the length; and the value of S is about 2 to about 400,000 times that of a fiber having a modulus of 65 GPa, a diameter of 20 microns, and a length of 12 mm.

* * * * *